United States Patent
Livingston

(10) Patent No.: US 6,513,141 B1
(45) Date of Patent: Jan. 28, 2003

(54) SAMPLED AMPLITUDE READ CHANNEL EMPLOYING A TRELLIS SEQUENCE DETECTOR AND A POST PROCESSOR FOR GENERATING ERROR METRICS USED TO CORRECT ERRORS MADE BY THE TRELLIS SEQUENCE DETECTOR

(75) Inventor: Jay N. Livingston, Lafayette, CO (US)

(73) Assignee: Cirrus Logic Inc., Austin, TX (US)

( * ) Notice: Subject to any disclaimer, the term of this patent is extended or adjusted under 35 U.S.C. 154(b) by 0 days.

(21) Appl. No.: 09/307,645

(22) Filed: May 7, 1999

(51) Int. Cl.[7] .............................................. H03M 13/03

(52) U.S. Cl. ........................... 714/792; 369/59; 360/53

(58) Field of Search ................................ 714/703, 795, 714/792; 360/46, 51, 65, 53; 375/263, 341; 369/59

(56) References Cited

U.S. PATENT DOCUMENTS

| | | | |
|---|---|---|---|
| 5,521,945 A | | 5/1996 | Knudson ..................... 375/341 |
| 5,771,127 A | | 6/1998 | Reed et al. ................... 360/51 |
| 5,774,286 A | * | 6/1998 | Shimoda ...................... 360/46 |
| 5,774,470 A | * | 6/1998 | Nishiya et al. .............. 714/703 |
| 5,809,080 A | * | 9/1998 | Karabed et al. ............. 375/263 |
| 5,844,741 A | | 12/1998 | Yamakawa et al. ........... 360/65 |
| 5,889,823 A | * | 3/1999 | Agazzi et al. ............... 375/341 |
| 5,938,790 A | | 8/1999 | Marrow ....................... 714/795 |
| 5,949,831 A | | 9/1999 | Coker et al. ................. 375/341 |
| 6,185,173 B1 | * | 2/2001 | Livingston et al. ........... 369/59 |
| 6,185,175 B1 | * | 2/2001 | Zook ........................... 369/59 |

OTHER PUBLICATIONS

Roger Wood, "Turbo–PRML: A Compromise EPRML Detector," *IEEE Transactions on Magnetics*, vol. 29, No. 6, Nov. 1993.

Hideyuki Yamakawa, "SPERD: Simplified Partial Error Response Detection," *IEEE Inter Mag '95*, San Antonio, Texas, Apr. 1995.

Takushi Nishiya, "PERD: Partial Error Response Detection," *IEEE Inter Mag '95*, San Antonio, Texas, Apr. 1995.

Takushi Nishiya and Hideyuki Yamakawa, "PERD: Partial Error Response Detection," *IEEE Transactions on Magnetics*, vol. 31, No. 6, Nov. 1995.

McEwen, Wolf, "Trellis Codes for (1,k) $E^2PR4ML$ with Squared Distance 18", *IEEE Transactions on Magnetics*, vol. 32, No. 5, Sep. 1996.

J. Hagenauer and P. Hoeher, "A Viterbi Algorithm with Soft–Decision Outputs and its Applications", Conference Proceedings, IEEE Globecom, Dallas, TX, Nov., 1989.

Bahl et al, "Optimal Decoding of Linear Codes for Minimizing Symbol Error Rate", *IEEE Trans. on Information Theory*, Mar., 1974.

U.S. patent application Ser. No. 08/862,493, to Reed et al., filed May 23, 1997.

U.S. patent application Ser. No. 08/127,101 to Livingston, filed Jul. 31, 1998.

* cited by examiner

*Primary Examiner*—David Ton
(74) *Attorney, Agent, or Firm*—Dan A. Shifrin, Esq.; Swanson & Bratschun

(57) ABSTRACT

In a sampled amplitude read channel for disk storage systems, a post processor is employed to correct errors in a preliminary sequence caused by the dominant error events of a trellis sequence detector. By correlating a sample error sequence with the dominant error events, error filters compute a Euclidean distance error metric between the samples sequence selected by the trellis sequence detector and the sample sequence that would have been selected if an error event did not occur. The minimum error metric is assigned to the symbols in the preliminary sequence that differ from the symbol sequence that would have been generated if the error event did not occur. After processing a predetermined number of the symbols in the preliminary sequence, the error metrics assigned, to the symbols are used to detect and correct error events in the preliminary sequence.

33 Claims, 13 Drawing Sheets

NRZ

PR 4

EPR 4

EEPR 4

SAMPLED AMPLITUDE READ CHANNEL EMPLOYING A TRELLIS SEQUENCE DETECTOR AND A POST PROCESSOR FOR GENERATING ERROR METRICS USED TO CORRECT ERRORS MADE BY THE TRELLIS SEQUENCE DETECTOR

CROSS REFERENCE TO RELATED APPLICATIONS AND PATENTS

This application is related to co-pending U.S. patent application Ser. No. 09/307,283 entitled "ERROR CORRECTION USING RELIABILITY VALUES FOR DATA MATRIX" filed on the same day as this application. This application is also related to U.S. Pat. No. 6,032,284 entitled "TRELLIS CODING SYSTEM FOR DISC STORAGE SYSTEMS," U.S. Pat. No. 5,696,639 entitled "SAMPLED AMPLITUDE READ CHANNEL EMPLOYING A REMOD/DEMOD SEQUENCE DETECTOR GUIDED BY AN ERROR SYNDROME," U.S. Pat. No. 6,185,173 entitled "A SAMPLED AMPLITUDE READ CHANNEL EMPLOYING A TRELLIS SEQUENCE DETECTOR MATCHED TO A CHANNEL CODE CONSTRAINT AND A POST PROCESSOR FOR CORRECTING ERRORS IN THE DETECTED BINARY SEQUENCE USING THE SIGNAL SAMPLES AND AN ERROR SYNDROME", U.S. Pat. No. 5,771,127 entitled "A SAMPLED AMPLITUDE READ CHANNEL EMPLOYING INTERPOLATED TIMING RECOVERY AND A REMOD/DEMOD SEQUENCE DETECTOR," U.S. Pat. No. 5,585,975 entitled "EQUALIZATION FOR SAMPLE VALUE ESTIMATION AND SEQUENCE DETECTION IN A SAMPLED AMPLITUDE READ CHANNEL" and U.S. Pat. No. 5,291,499 entitled "METHOD AND APPARATUS FOR REDUCED-COMPLEXITY VITERBI-TYPE SEQUENCE DETECTORS." The above-named patent and patents are assigned to the same entity, and are incorporated herein by reference.

FIELD OF INVENTION

The present invention relates to the recording and reproduction of binary data in disk storage systems for digital computers, particularly to a sampled amplitude read channel employing a post processor for generating error event error metrics for use in detecting and correcting errors made by a trellis sequence detector.

BACKGROUND OF THE INVENTION

In disk drive storage devices for digital computers, such as magnetic and optical disk drives, sampled amplitude read channels employing partial response (PR) signaling with maximum likelihood (ML) sequence detection have provided a substantial increase in storage capacity by enabling significantly higher linear bit densities. Partial response signaling refers to a particular method for transmitting symbols represented as analog pulses through a communication medium. The benefit is that at the signaling instances (baud rate) there is no intersymbol interference (ISI) from other pulses except for a controlled amount from immediately adjacent, overlapping pulses. Allowing the pulses to overlap in a controlled manner leads to an increase in the symbol rate (linear recording density) without sacrificing performance in terms of signal-to-noise ratio (SNR).

Partial response channels are characterized by the polynomials $$(1-D)(1+D)^n$$

where D represents a delay of one symbol period and n is an integer. For n=1,2,3, the partial response channels are referred to as PR4, EPR4 and EEPR4, with their respective frequency responses shown in FIG. 1A. The channel's dipulse response, the response to an isolated symbol, characterizes the transfer function of the system (the output for a given input). With a binary "1" bit modulating a positive dipulse response and a binary "0" bit modulating a negative dipulse response, the output of the channel is a linear combination of time shifted dipulse responses. The dipulse response for a PR4 channel $(1-D^2)$ is shown as a solid line in FIG. 1B. Notice that at the symbol instances (baud rate), the dipulse response is zero except at times t=0 and t=2. Thus, the linear combination of time shifted PR4 dipulse responses will result in zero ISI at the symbol instances except where immediately adjacent pulses overlap.

It should be apparent that the linear combination of time shifted PR4 dipulse responses will result in a channel output of +2, 0, or −2 at the symbol instances depending on the binary input sequence. The output of the channel can therefore be characterized as a state machine driven by the binary input sequence, and conversely, the input sequence can be estimated or demodulated by running the signal samples at the output of the channel through an "inverse" state machine. Because noise will obfuscate the signal samples, the inverse state machine is actually implemented as a trellis sequence detector which computes a most likely input sequence associated with the signal samples (i.e., the sequence through a trellis that is closest to the signal samples in Euclidean space).

Operation of a PR4 trellis sequence detector is understood from its state transition diagram shown in FIG. 2A. Each state 100 is represented by the last two input symbols (in NRZ after preceding), and each branch from one state to another is labeled with the current input symbol in NRZ 102 and the corresponding sample value 104 it will produce during readback. The demodulation process of the PR4 sequence detector is understood by representing the state transition diagram of FIG. 2A as a trellis diagram shown in FIG. 2B. The trellis diagram represents a time sequence of sample values and the possible recorded input sequences that could have produced the sample sequence. For each possible input sequence, an error metric is computed relative to a difference between the sequence of expected sample values that would have been generated in a noiseless system and the actual sample values output by the channel. For instance, a Euclidean metric is computed as the accumulated square difference between the expected and actual sample values. The input sequence that generates the smallest Euclidean metric is the most likely sequence to have created the actual sample values; this sequence is therefore selected as the output of the sequence detector.

To facilitate the demodulation process, the sequence detector comprises path memories for storing each of the possible input sequences and a corresponding metric. A well known property of the sequence detector is that the paths storing the possible input sequences will "merge" into a most likely input sequence after a certain number of sample values are processed, as long as the input sequence is appropriately constrained. In fact, the maximum number of path memories needed equals the number of states in the trellis diagram; the most likely input sequence will always be represented by one of these paths, and these paths will eventually merge into one path (i.e., the most likely input sequence) after a certain number of sample values are processed.

The "merging" of path memories is understood from the trellis diagram of FIG. 2B where the "survivor" sequences are represented as solid lines. Notice that each state in the trellis diagram can be reached from one of two states; that is, there are two transition branches leading to each state. With each new sample value, the Viterbi algorithm recursively computes a new error metric and retains a single survivor sequence for each state corresponding to the minimum error metric. In other words, the Viterbi algorithm will select one of the two input branches into each state since only one of the branches will correspond to the minimum error metric, and the paths through the trellis corresponding to the branches not selected will merge into the paths that were selected. Eventually, all of the survivor sequences will merge into one path through the trellis which represents the most likely estimated data sequence to have generated the sample values as shown in FIG. 2B.

In some cases, if the input sequence is not appropriately constrained through the use of a channel code, the path memories will not merge into one survivor sequence. Consider the PR4 trellis shown in FIG. 2B; an input sequence of all zeros or all ones will prevent the paths from merging which leads to multiple possible survivor sequences output by the detector. Data sequences which prevent the path memories from merging are referred to as "quasi-catastrophic" data sequences since they result in quasi-catastrophic errors in the output sequence. In order to avoid quasi-catastrophic errors, a channel code is typically employed which codes out of the recorded data all sequences which can prevent the path memories from merging.

Even if the quasi-catastrophic data sequences are coded out of the input sequence, the sequence detector can still make an error in detecting the output sequence if enough destructive noise is present in the read signal. The possible output sequences are different from one another by a minimum Euclidean distance; a detection error typically occurs when the signal noise breaches this minimum distance between valid output sequences. FIGS. 3A–3D illustrate the sample error sequences associated with the dominant minimum distance error events of a PR4 sequence detector in NRZ, PR4, EPR4 and EEPR4 space, respectfully. In general, a higher order sequence detector will outperform a lower order sequence detector due to the number of data samples the error event affects. Consider, for example, the first error event in the NRZ space shown in FIG. 3A. This error event generates two noise samples which corrupt two data samples (two output bits) in the PR4 space of FIG. 3B, four noise samples in the EPR4 space of FIG. 3C, and four noise samples with two having increased magnitude in the EEPR4 space of FIG. 3D. This "spreading out" of the error event reduces the probability of a detection error.

A minimum distance error event can occur where the data sequences diverge from a particular state in the trellis and then remerge at a later state. In a perfect system, all of the minimum distance error events will occur with equal probability. However, because the channel equalizers correlate the noise in the signal samples, the minimum length, minimum distance error events are more likely to occur. Thus, the error events shown in FIGS. 3A–3D are the "dominant" minimum distance error events because they are shortest in length. The first error event ((+) in NRZ), which is the shortest error event, is typically the most dominant; however, depending on the partial response polynomial employed, other error events may become the most dominant as the linear bit density increases.

An increase in performance can be achieved by employing a channel code to code out data sequences associated with the minimum distance error events (similar to coding out the quasi-catastrophic data sequences), and then to match the sequence detector to this channel code using conventional trellis coded modulation (TCM) techniques. For example, the minimum distance error events shown in FIG. 3A can be coded out by removing the bit sequences consisting of (1,0,1) or (0,1,0) from the input sequence. The state machine of a PR4 sequence detector can then be matched to this code constraint by removing the inner branches shown in FIG. 2A. With these branches removed, the minimum distance of the PR4 sequence detector increases from $dmin^2=2$ to $dmin^2=4$ (with the signal samples normalized to +1, 0, −1).

The recording and reproduction of digital data through a disk storage medium can be modeled as a communication channel. Partial response signaling is particularly well suited to disk storage systems because they are bandpass channels in nature and therefore less equalization is required to match the overall response to a desired partial response polynomial. Referring to FIG. 1A, higher order partial response polynomials, such as EEPR4, are more closely matched to the channel's natural response than lower order polynomials, particularly at higher linear densities. Thus, in addition to spreading out the error samples as shown in FIG. 3, higher order partial response channels typically provide better performance since less equalization is required to match the channel's response to the desired partial response. However, the trade-off in performance is the cost of complexity; the number of states in the state machine equals $2^{n+1}$ which means an exponential increase in complexity as the order of the polynomial increases. A full EEPR4 state machine comprises sixteen states (n=3) compared to only four states in a PR4 state machine.

Similar to the PR4 read channel described above, matching the EPR4 state machine to a run-length limited (RLL) d=1 constraint (which prevents consecutive NRZI "1" bits) codes out many of the minimum distance error events of an EPR4 sequence detector, thereby providing a coding gain over an uncoded EPR4 sequence detector. However, a disadvantage to the RLL d=1 constraint is the attendant decrease in code rate, the ratio of user data bits to codeword bits which is typically 2/3 in an RLL (1,7) system. The decrease in code rate is undesirable because it decreases the user data density and hence the overall storage capacity of the disk. The user data density and storage capacity can be increased by increasing the channel data density, but this increases the bit error rate due to the effective decrease in SNR. Further, increasing the channel density requires faster read channel circuitry to compensate for the increase in the channel data rate.

Similar performance gains can be achieved with channel codes that exhibit higher code rates, but this typically leads to a more complex implementation in matching the state machine of the trellis sequence detector to the code constraint, as well as more complex encoder/decoder (ENDEC) circuitry for implementing the channel code. For example, the above-referenced co-pending patent application entitled "TRELLIS CODING SYSTEM FOR DISC STORAGE SYSTEMS" employs a channel code which constrains the occurrence of tribits to k-modulo-3, and forbids runs of four or longer consecutive NRZI "1" bits. The theoretical capacity of this code is 0.9032 with a practical code rate of 8/9 as compared to the 2/3 rate of a typical RLL d=1 code. However, the trade-off is the increase in complexity in matching the trellis state machine to the code constraint; it requires a more sophisticated time-varying state machine which changes structure at times k-modulo-3. Further, implementing the k-modulo-3 code constraint requires a more sophisticated ENDEC as compared to the ENDEC required to implement the less complex RLL d=1 code constraint.

There is, therefore, a need for a sampled amplitude read channel for use in disk storage systems that provides a performance enhancing improvement by attenuating the dominant error events of a trellis sequence detector without significantly decreasing the storage it system's code rate and without significantly increasing the cost and complexity of the trellis sequence detector and channel ENDEC.

SUMMARY OF THE INVENTION

In a sampled amplitude read channel for disk storage systems (e.g., magnetic or optical disk drives), a post process is employed to correct errors in a preliminary sequence caused by the dominant error events of a trellis sequence detector. A sample error sequence is generated by remodulating the preliminary sequence into a sequence of estimated sample values, and subtracting this estimated sequence from the read signal sample values. The post processor comprises a bank of error filters matched to the dominant error events of the trellis sequence detector. By correlating the sample error sequence with the dominant error events, the error filters compute a Euclidean distance error metric between the samples sequence selected by the trellis sequence detector and the sample sequence that would have been selected if an error event did not occur. The minimum error metric is assigned to the symbols in the preliminary sequence that differ from the symbol sequence that would have been generated if the error event did not occur. After processing a predetermined number of the symbols in the preliminary sequence, the error metrics assigned to the symbols are used to detect and correct error events in the preliminary sequence.

In one embodiment of the present invention, the post processor is guided by an error syndrome generated from an error detection channel code. When the error syndrome indicates an error is present in a codeword block, the error metrics assigned to the symbols in the preliminary sequence are evaluated to determine the most likely error event to have caused the error. For example, the most likely error event occurs where the error metrics are consistent with a dominant error event, the error metrics are minimum, and the error event is consistent with the error syndrome.

The error detection code embodiment of the present invention approximates the performance gain provided by matching the trellis sequence detector's state machine to the error detection code, but with a significant reduction in cost and complexity. In addition, the error detection code can be implemented with a high code rate using a relatively unsophisticated ENDEC. For example, a simple parity error detection code can be implemented with a code rate of 64/69 using a conventional 16/17 RLL ENDEC concatenated with a simple parity generator as described in the above-referenced co-pending patent application entitled "SAMPLED AMPLITUDE READ CHANNEL EMPLOYING A REMOD/DEMOD SEQUENCE DETECTOR GUIDED BY AN ERROR SYNDROME."

BRIEF DESCRIPTION OF THE DRAWINGS

The above and other aspects and advantages of the present invention will be better understood by reading the following detailed it description of the invention in conjunction with the drawings, wherein.

DETAILED DESCRIPTION OF THE PREFERRED EMBODIMENT

Data Format

Figure 4A:
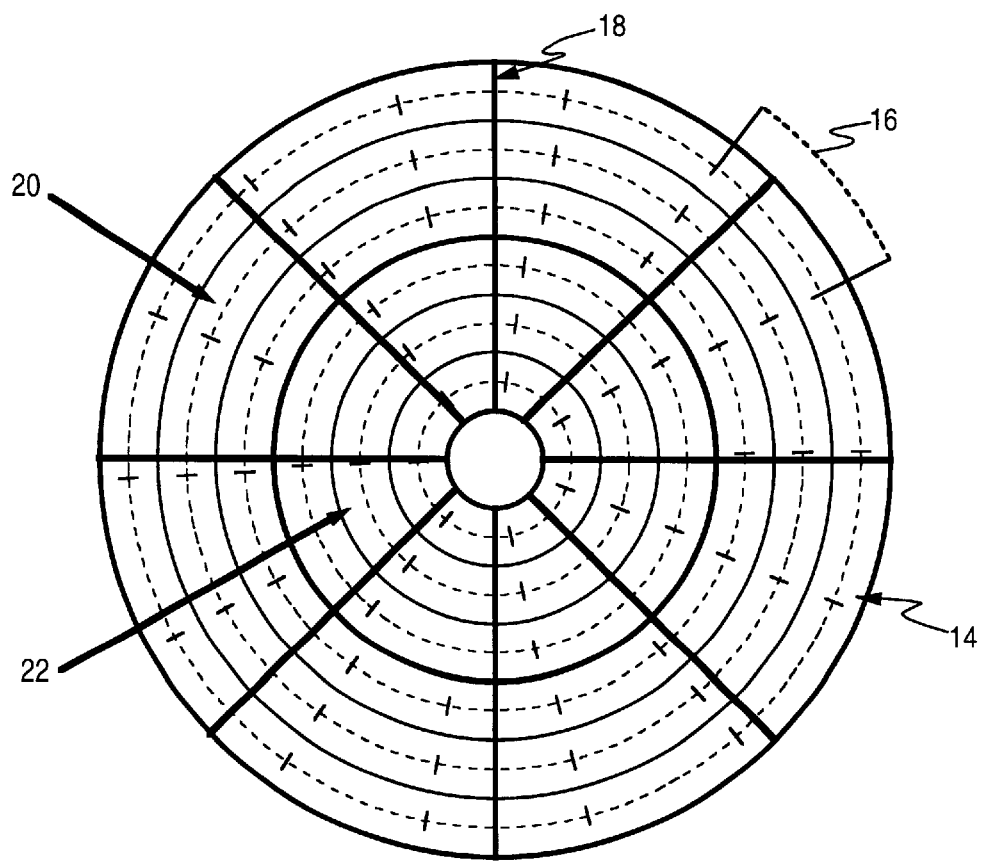
FIG. 4A shows a typical data format for a magnetic disk storage medium, comprising a plurality of concentric data tracks grouped in predefined zones, where each data track is partitioned into a number of data sectors.

FIG. 4A shows a conventional data format of a magnetic disk storage medium comprising a series of concentric, radially spaced data tracks 14, wherein each data track 14 comprises a plurality of sectors 16 with embedded servo wedges 18. A servo controller (not shown) processes the servo data in the servo wedges 18 and, in response, positions a read/write head over a selected track. Additionally, the servo controller processes servo bursts within the servo wedges 18 to keep the head aligned over a centerline of the selected track while writing and reading data. The servo wedges 18 may be detected by a simple discrete-time pulse detector or by a discrete-time sequence detector. The format of the servo wedges 18 includes a preamble and a sync mark, similar to the user data sectors 16 described below with reference to FIG. 4B.

Zoned recording is a technique known in the art for increasing the storage capacity by recording the user data at different rates in predefined zones between the inner diameter and outer diameter tracks to attain a substantially constant linear bit density. The data rate can be increased at the outer diameter tracks due to the increase in circumferential recording area and the decrease in intersymbol interference. This allows more data to be stored in the outer diameter tracks as is illustrated in FIG. 4A where the disk is partitioned into an outer zone 20 comprising fourteen data sectors per track, and an inner zone 22 comprising seven data sectors per track. In practice, the disk is actually partitioned into several zones with increasing data rates from the inner to outer diameter zones.

Figure 4B:
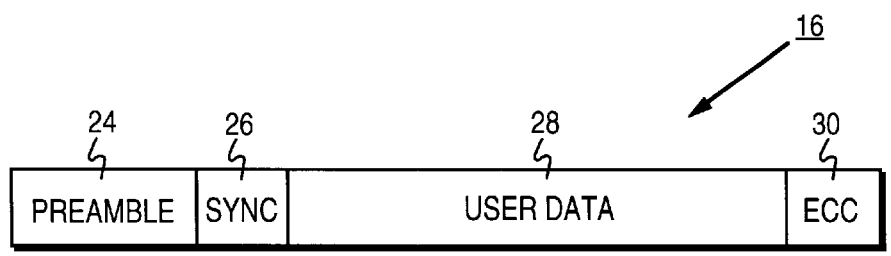
FIG. 4B shows a typical format for a data sector.

FIG. 4B shows the format of a data sector 16 comprised of an acquisition preamble 24, a sync mark 26, a user data field 28, and appended ECC bytes 30 for use in detecting and correcting errors in the user data upon readback. Timing recovery 68 of FIG. 5 processes the acquisition preamble 24 to acquire the correct data frequency and phase before reading the user data field 28, and the sync mark 26 demarks the beginning of the user data field 28 for use in symbol synchronizing the user data. In one embodiment of the present invention, the user data 28 are encoded according to an error detection channel code for enhancing the performance of the post processor 95 of FIG. 5 as described in greater detail below.

Sampled Amplitude Read Channel

Figure 5:
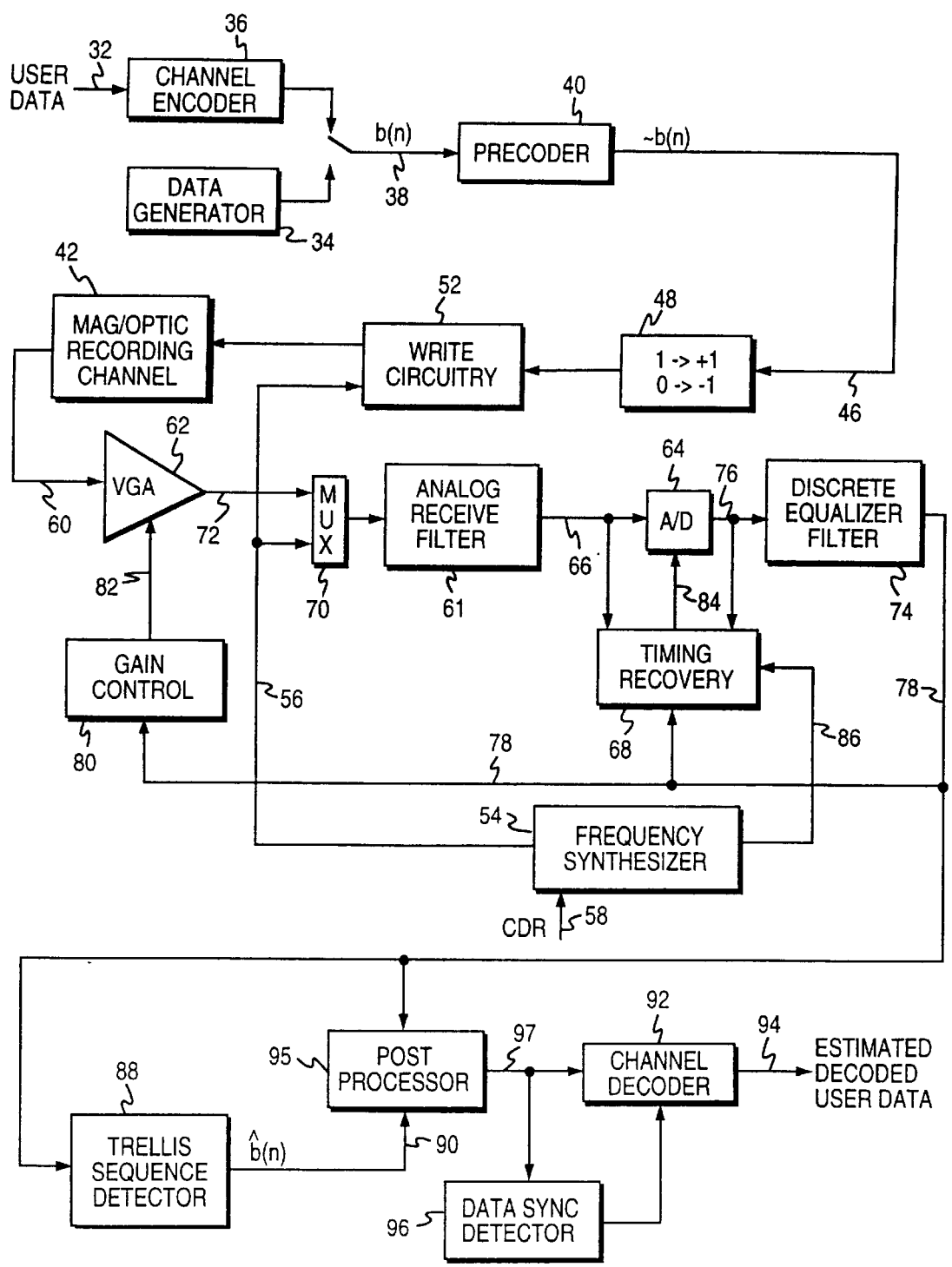
FIG. 5 is a block diagram of the sampled amplitude read channel of the present invention, including a trellis sequence detector, and a post-processor for correcting the dominant error events made by the trellis sequence detector using Euclidean error metrics and an error detection code.

Referring now to FIG. 5, shown is a block diagram of the sampled amplitude read channel of the present invention. During a write operation, the read channel receives user data over line 32 from the host system. A data generator 34 generates the preamble 24 of FIG. 4B (for example 2T preamble data) written to the disk prior to writing the user data 28. The data generator 34 also generates a sync mark 26 for use in symbol synchronizing to the user data during a read operation. A channel encoder 36 encodes the user data 32 according to particular channel code constraints, for example, a run-length-limited (RLL) constraint. In addition, the channel encoder 36 may optionally encode an error detection code, such as a parity constraint, used during a read operation to correct errors in the preliminary sequence 0b(n) 90 detected by a trellis sequence detector 88. The error detection code may be implemented using a single channel encoder as described in the above referenced commonly assigned patent entitled "A SAMPLED AMPLITUDE READ CHANNEL EMPLOYING A TRELLIS SEQUENCE DETECTOR MATCHED TO A CHANNEL CODE CONSTRAINT AND A POST PROCESSOR FOR CORRECTING ERRORS IN THE DETECTED BINARY SEQUENCE USING THE SIGNAL SAMPLES AND AN ERROR SYNDROME", or it may be implemented by concatenating channel encoders as described in the above referenced commonly assigned patent entitled "SAMPLED AMPLITUDE READ CHANNEL EMPLOYING A REMOD/DEMOD SEQUENCE DETECTOR GUIDED BY AN ERROR SYNDROME".

After encoding 36 the channel code constraints, a precoder 40 precodes the input sequence b(n) 38 in order to compensate for the transfer function of the recording channel 42 and equalizing filters. The resulting write sequence ~b(n) 46 then modulates 48 the current of the write circuitry 52, thereby modulating the current in the recording head coil (or intensity of a laser beam) at the zone baud rate to record a sequence of transitions onto the disk 42 which represent the recorded data. In NRZ recording, a "1" bit modulates 48 a positive polarity in the write current and a "0" bit modulates 48 a negative polarity. A frequency synthesizer 54 provides a baud rate write clock 56 to the write circuitry 52 and is adjusted by a baud or channel data rate signal (CDR) 58 according to the current zone the recording head is over.

Figure 1A:
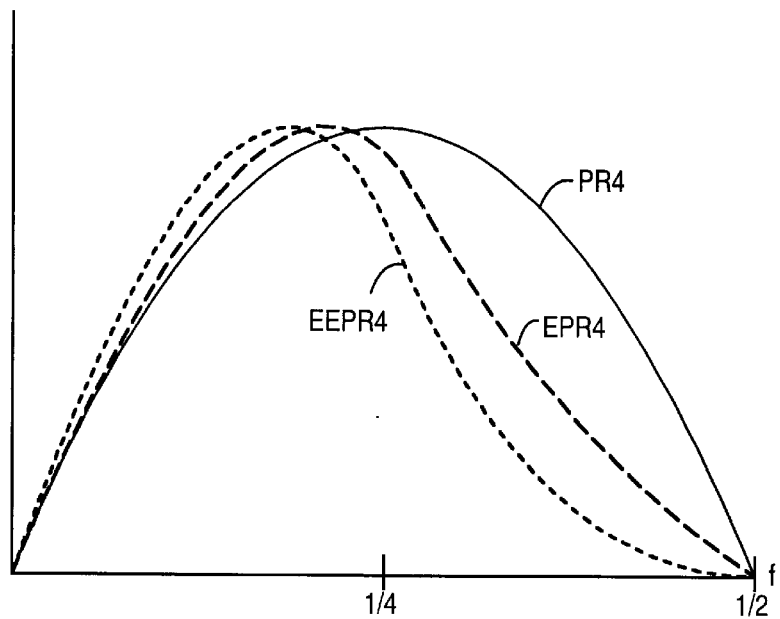
FIG. 1A shows the frequency response for a PR4, EPR4 and EEPR4 read channel.
Figure 1B:
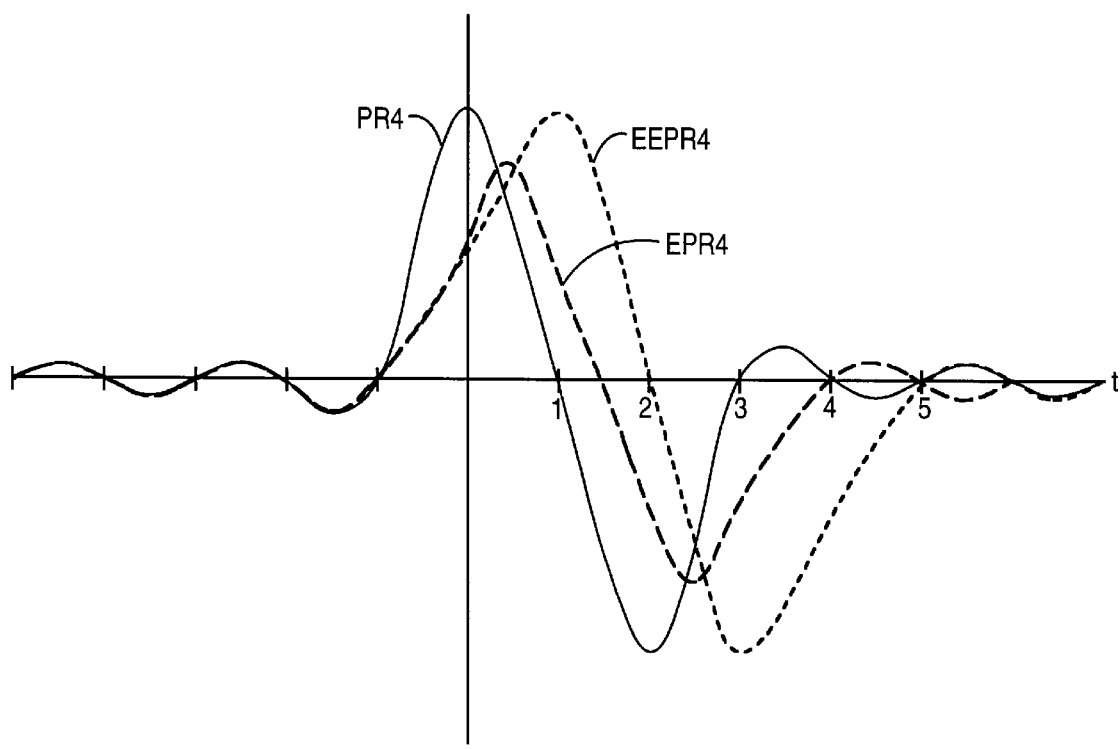
FIG. 1B shows the dipulse responses for the PR4, EPR4 and EEPR4 read channels of FIG. 1A.
Figure 2A:
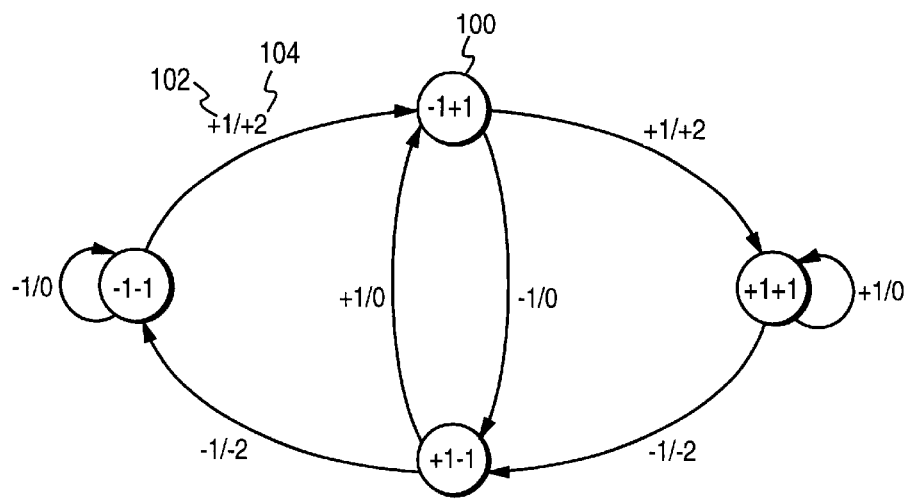
FIG. 2A is a state transition diagram for a PR4 sequence detector.
Figure 2B:
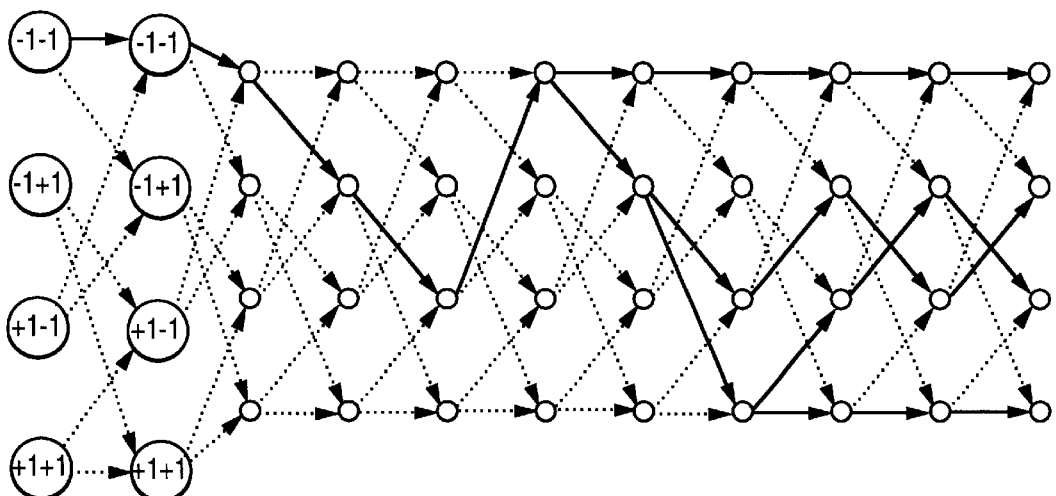
FIG. 2B is a trellis diagram corresponding to the PR4 state transition diagram of FIG. 2A showing the path memory and survivor sequence for a given input sequence.

When reading the recorded binary sequence from the media 42, timing recovery 68 first locks to the write frequency of the zone by selecting, as the input to the read channel, the write clock 56 through a multiplexer 70. Once locked to the write frequency, which is the nominal sampling frequency, the multiplexer 70 selects the signal 72 from the read head as the input to the read channel in order to acquire the acquisition preamble 24 recorded on the disk prior to the recorded user data 28 as shown in FIG. 4B. A variable gain amplifier 62 adjusts the amplitude of the analog read signal 60, and an analog receive filter 61 provides initial equalization toward the desired response as well as attenuating aliasing noise. A sampling device 64 samples the analog read signal 66 from the analog filter 61, and a discrete-time equalizer filter 74 provides further equalization of the sample values 76 toward the desired response. Table 1 shows normalized values for the PR4, EPR4 and EEPR4 dipulse responses of FIG. 1B:

TABLE 1

| Channel | Transfer Function | Dipulse Response |
| --- | --- | --- |
| PR4 | (1 − D) (1 + D) | 0, 1, 0, −1, 0, 0, 0, . . . |
| EPR4 | (1 − D) (1 + D)$^2$ | 0, 1, 1, −1, −1, 0, 0, . . . |
| EEPR4 | (1 − D) (1 + D)$^3$ | 0, 1, 2, 0, −2, −1, 0, . . . |

The discrete equalizer filter 74 may be implemented as a real-time adaptive filter which compensates for parameter variations over the disk radius (i.e., zones), disk angle, and environmental conditions such as temperature drift.

After equalization, the equalized sample values 78 are applied to a decision directed gain control 80 and timing recovery 68 circuit for adjusting the amplitude of the read signal 60 and the frequency and phase of the sampling device 64, respectively. Gain control 80 adjusts the gain of variable gain amplifier 62 over line 82 in order to match the magnitude of the channel's frequency response to the desired partial response (e.g., a response shown in FIG. 1A), and timing recovery 68 adjusts the frequency of sampling device 64 over line 84 in order to synchronize the equalized samples 78 to the baud rate. Frequency synthesizer 54 provides a course center frequency setting to the timing recovery circuit 68 over line 86 in order to center the timing recovery frequency over temperature, voltage, and process variations.

The sampling device 64 is shown in FIG. 5 as an analog-to-digital (A/D) converter. However, those skilled in the art understand that the sampling device 64 could be a simple sample and hold circuit for converting the analog read signal 66 into a sequence of discrete-time analog samples, and the downstream circuitry, such as the discrete-time equalizer filter 74, timing recovery 68, gain control 80, etc., could be implemented using conventional discrete-time analog (DTA) circuitry. In an alternative embodiment the read channel could be implemented using a hybrid of DTA and digital circuits; for example, the discrete-time equalizer filter 74 could be implemented using DTA, the equalized sample values 78 converted to digital values, and the sequence detector 88 implemented using digital circuitry.

In the preferred embodiment, the discrete-time equalizer 74 equalizes the sample values 76 into a PR4 response so that a simple slicer circuit (not shown) can generate estimated sample values for use in the timing recovery 68 and gain control 80 decision-directed feedback loops. The PR4 equalized samples 78 are then passed through a $(1-D)^n$ filter to generate sample values in the partial response domain of the trellis sequence detector 88. For implementation details concerning various alternative embodiments for sample value estimation for timing recovery 68 and gain control 80, see the above referenced U.S. Pat. No. 5,585,975, "EQUALIZATION FOR SAMPLE VALUE ESTIMATION AND SEQUENCE DETECTION IN A SAMPLED AMPLITUDE READ CHANNEL."

The synchronous, equalized samples 78 are ultimately input into a trellis sequence detector 88 which detects a preliminary sequence ^b(n) 90 from the sample values. A post processor 95 generates error metrics from the read signal samples 78 and the preliminary sequence ^b(n) 90, where the error metrics indicate when the sequence detector 88 has made a detection error. When an error is detected, the post processor 95 determines the most likely location within the preliminary sequence ^b(n) 90 that the error occurred and corrects it. If an error detection code is employed, then the post processor 95 also generates an error syndrome from the preliminary sequence ^b(n) 90 and only makes a correction when the error syndrome indicates an error is present.

The corrected binary sequence 97 output by the post processor 95 is decoded by a channel decoder 92 which implements the inverse operation of the channel encoder 36 to thereby generate an estimated user data sequence 94. A data sync detector 96 detects the sync mark 26 (shown in FIG. 4B) in the data sector 16 in order to frame operation of the channel decoder 92. A detailed description of the trellis sequence detector 88 and post processor 95, including the performance enhancing aspects of the error metric generator and error detection channel code, is provided in the following sections.

Trellis Sequence Detector and Post Processor

Figure 3A:
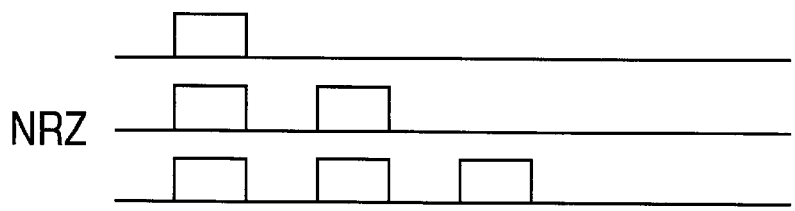
FIGS. 3A–3D show the dominant minimum distance error events of a PR4 sequence detector in NRZ, PR4, EPR4 and EEPR4 space, respectively.
Figure 3B:
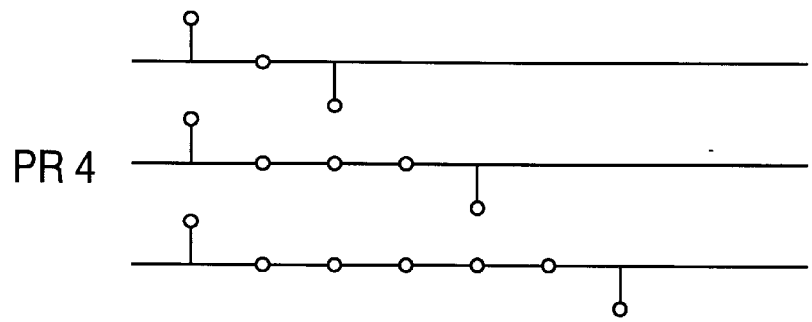
Figure 3C:
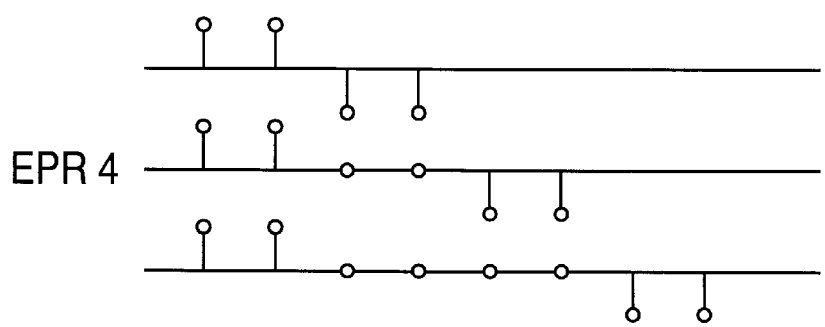
Figure 3D:
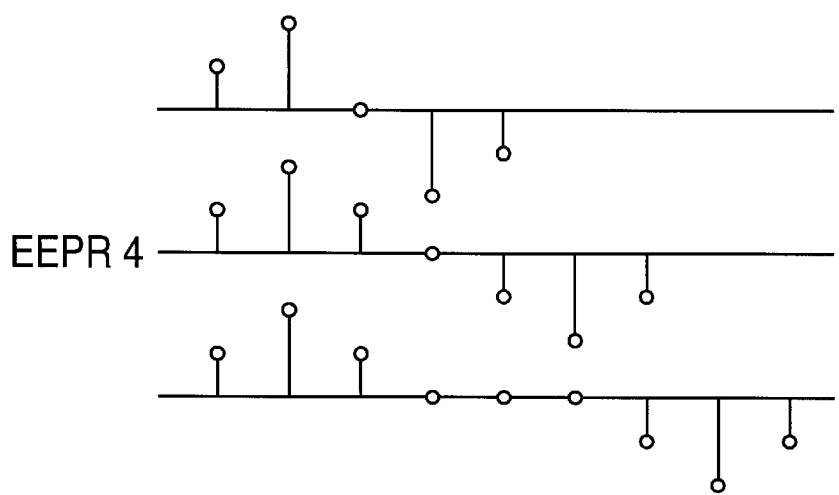
Figure 6:
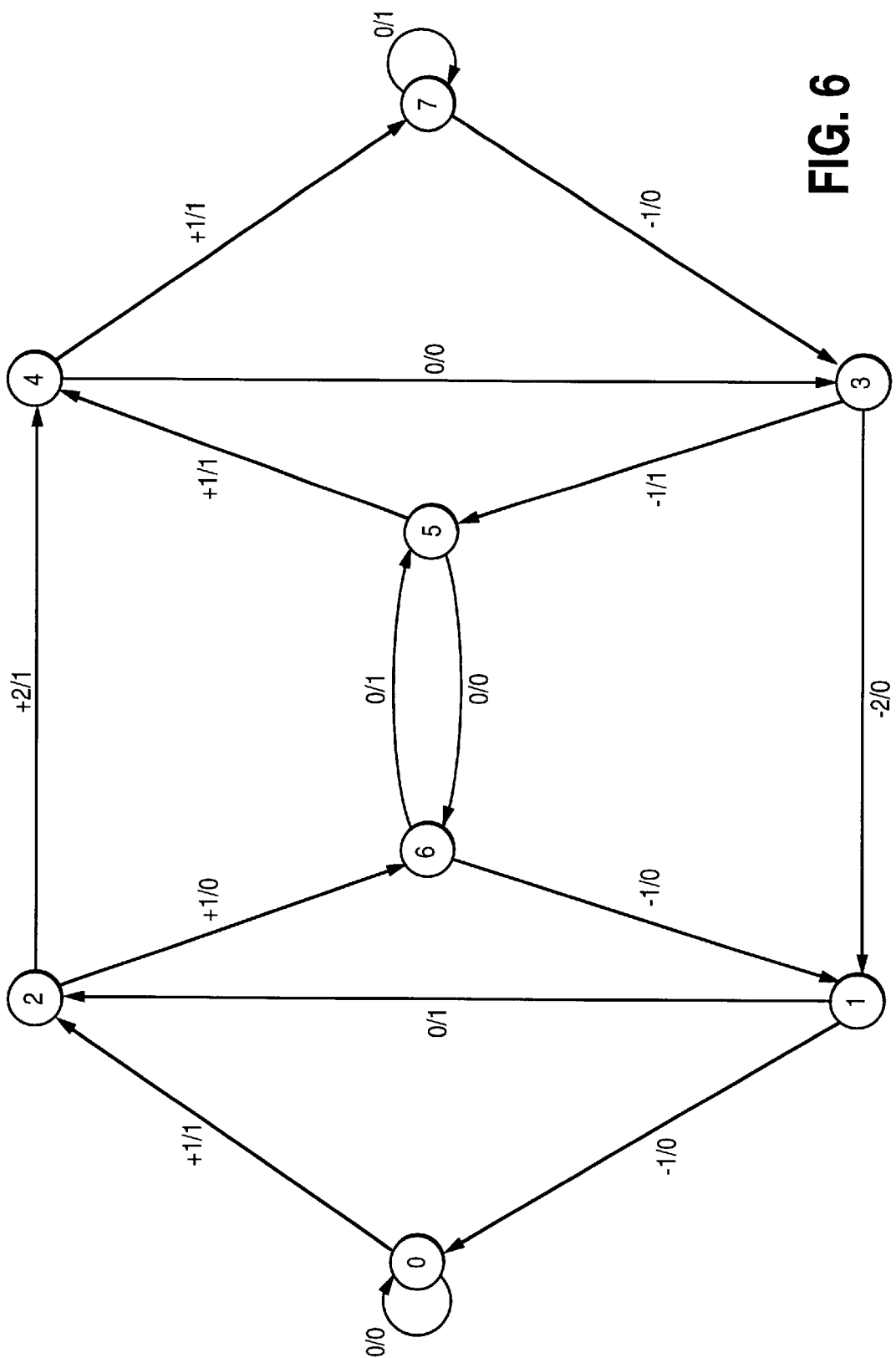
FIG. 6 is a state transition diagram for an EPR4 trellis sequence detector with the output bits labeled in NRZ.

In the preferred embodiment of the present invention, the trellis sequence detector 88 of FIG. 5 is implemented in the EPR4 domain. A conventional EPR4 state transition diagram with the output bits labeled in NRZ and comprising sixteen states is shown in FIG. 6. At user densities of 1.8 to 2.5 (number of user data bits in an interval equal to 1/2 p(t), where p(t) is the response of the read head to an isolated medium transition), it has been determined that the dominant error events of an EPR4 sequence detector are the NRZ (+) error event and the NRZ (+−+) error event. An error event is defined as the sample error sequence between two valid sample sequences through the trellis. For example, the NRZ (+) error event corresponds to the first sample error sequence shown in FIG. 3A which corresponds to the first sample error sequence shown in FIG. 3C in the EPR4 domain. An error event as discussed herein includes the equivalent error events of opposite polarity; for example, the NRZ (+) error event as discussed herein includes the NRZ (−) error event.

Figure 7A:
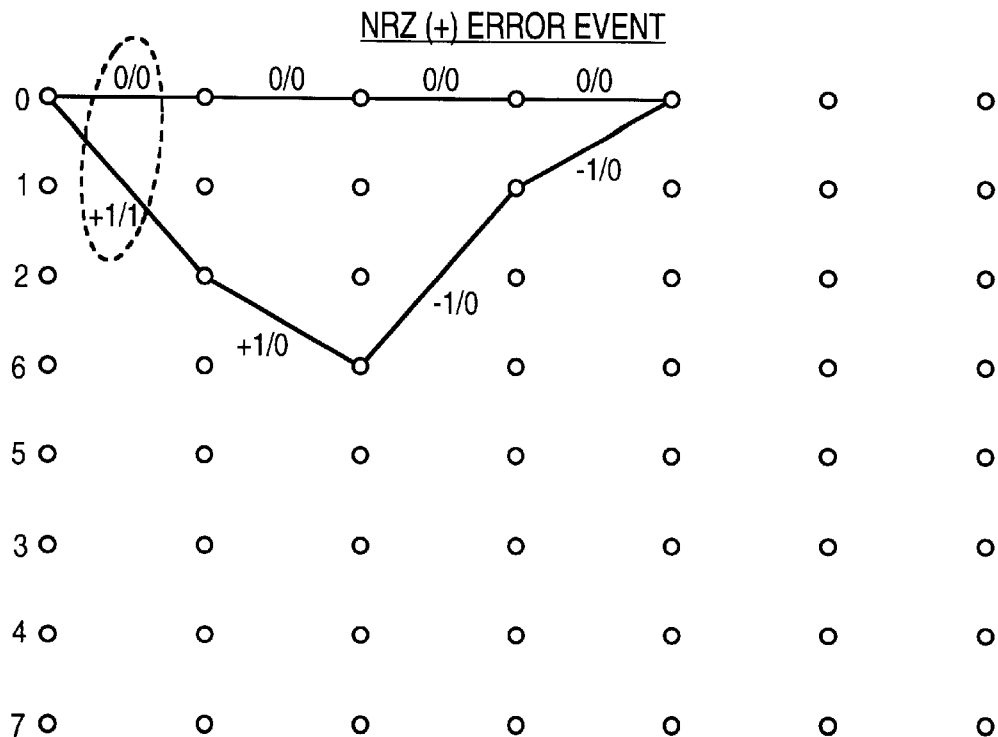
FIG. 7A illustrates two sample sequences and corresponding output sequences which differ by the NRZ (+) error event.

Referring now to FIG. 7A, shown is a trellis corresponding to the EPR4 state diagram of FIG. 6 with the states numbered down the left side of the trellis. The solid lines through the trellis in FIG. 7A represent two alternate sequences that differ by the dominant NRZ (+) error event. Notice that the difference between the sample sequences (i.e., the sample error sequence) is {+1,+1,−1,−1} which corresponds to the first EPR4 sample error sequence shown in FIG. 3C. Also notice that the detected NRZ output sequences differ by only one bit as indicated by the dashed circle. This is always the case for a NRZ (+) error event; the alternate output sequences will differ only in the first bit. As described in greater detail below, this characteristic is used in assigning error metrics to the preliminary sequence output by the trellis sequence detector.

Figure 7B:
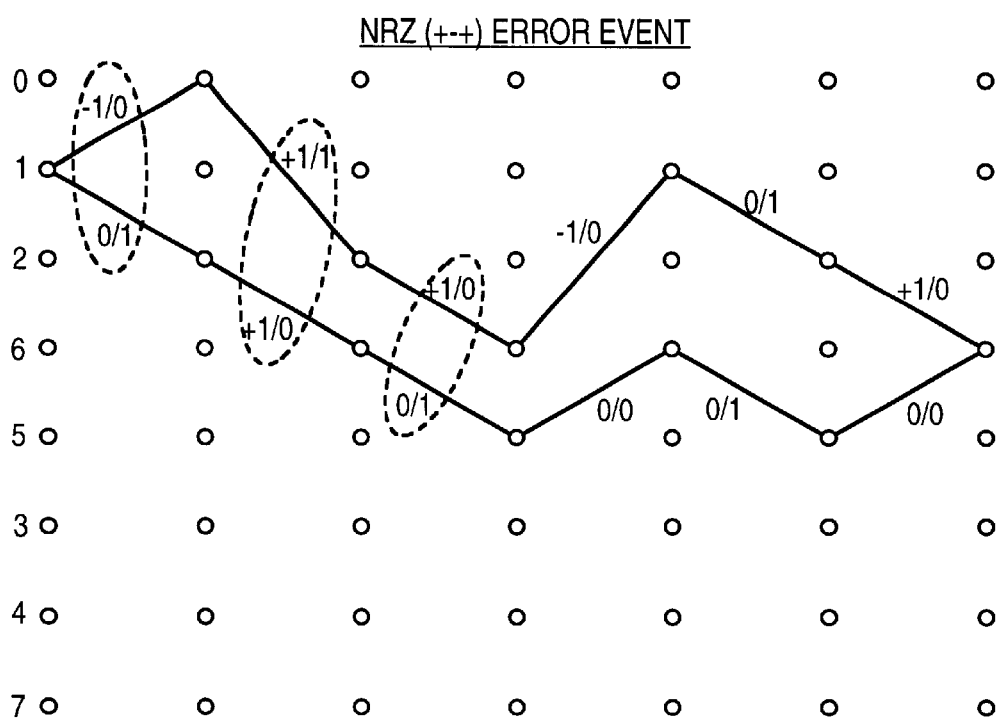
FIG. 7B illustrates two sample sequences and corresponding output sequences which differ by the NRZ (+−+) error event.

The next most dominant error event of the EPR4 trellis sequence detector, the NRZ (+−+) error event, is illustrated in FIG. 7B. Notice that for this error event, the first three bits are different in the alternate output sequences as indicated by the dashed circles. This is always the case for the NRZ (+−+) error event; the alternate output sequences will differ only in the first three bits. In general, any particular error event will cause the alternate output sequences to differ in a specific number of bits in a specific location. The present invention exploits this characteristic by generating the Euclidean error metric between the alternate sample sequence not selected by the trellis sequence detector and the read signal samples, and assigning this error metric to the bits that differ between the alternate sequences (as long as the error metric is less than the current error metric for a particular bit). Thus, each bit of the preliminary sequence 90 detected by the trellis sequence detector 88 is assigned an error metric, and the error metrics are subsequently used to detect and correct error events in the preliminary sequence. Before describing the circuitry for implementing this aspect of the present invention, a general mathematical description is provided to convey a better understanding of its operation.

The noise in the read signal, referred to as the noise sequence $n_k$, can be extracted by remodulating the preliminary sequence output by the trellis sequence detector 88 into a sample sequence $S_k$ in the partial response domain of the read signal samples, and then subtracting the remodulated sequence $S_k$ from the read signal samples $R_k$ $$n_k = R_k - S_k.$$

The above noise sequence $n_k$ will be accurate as long as the trellis sequence detector 88 does not make a detection error. Assuming, however, that the sequence detector 88 makes a detection error, then the correct sample sequence $T_k$ can be represented by $$T_k = S_k + E_k$$

where $E_k$ is the sample error sequence that, when added to the detected sample sequence $S_k$, generates the correct sample sequence $T_k$. Combining the above equations leads to $$T_k - R_k = S_k + E_k - n_k - S_k = E_k - n_k$$

where $T_k - R_k$ represents the sample error sequence or difference between the received sample sequence $R_k$ and the correct sample sequence $T_k$.

As described above the function of the trellis sequence detector 88 is to minimize the sum of the squared errors in selecting the most likely sequence associated with the received signal samples; however, when there is enough destructive noise in the read signal the trellis sequence detector 88 will select the wrong sequence. The general idea of the present invention is to employ a post processor 95 for detecting when the trellis sequence detector 88 has most likely made a detection error and to correct the error. In the preferred embodiment, an error detection channel code is employed to detect when the trellis sequence detector 88 has made a detection error. When an error is detected, the post processor 95 evaluates the sample error sequence $n_k$ with respect to the dominant error events of the trellis sequence detector 88 to determine where the error most likely occurred. In effect, the post processor 95 determines the minimum Euclidean distance (i.e., minimum sample error sequence in Euclidean space) between the received sample sequence $R_k$ and the correct sample sequence $T_k$ with respect to the dominant error events of the trellis sequence detector.

Minimizing the sample error sequence $n_k$ in Euclidean space can be represented mathematically using the above equations $$MIN\|(T_k - R_k)\|^2 \quad (1)$$

which from the above equations is equivalent to $$MIN\|(E_k - n_k)\|^2 \quad (2)$$

Equation (2) can be rewritten as $$MIN \sum_{k=0}^{L} (E_k - n_k)^2 \quad (3)$$

where L is the length of the received sample sequence. Equation (3) can be rewritten as $$MIN\left(\sum_{k=0}^{L} E_k^2 - 2\sum_{k=0}^{L} E_k n_k + \sum_{k=0}^{L} n_k^2\right). \quad (4)$$

In equation (4), the term $$\sum_{k=0}^{L} n_k^2$$

represents the noise in the read signal assuming that the trellis sequence detector 88 did not make a detection error (i.e., assuming that $E_k$ is zero). However, if the trellis sequence detector 88 makes a detection error, the remaining term in equation (4)

$$\frac{1}{2}\sum_{k=0}^{L} E_k^2 - \sum_{k=0}^{L} E_k n_k \quad (5)$$

represents the Euclidean distance or error metric between the read signal sample sequence and the correct sample sequence $T_k$ given that a particular error event $E_k$ occurred. The present invention computes equation (5) for various dominant error events $E_k$ and assigns the minimum error metric to the bits of the preliminary output sequence 90 that differ from the corresponding bits of the alternate sequence that would have been generated but for the error event (refer to the above discussion with respect to FIGS. 7A and 7B). When an error is detected (e.g., using an error detection code), the error metrics are evaluated to determine the error event that most likely caused the error (i.e., the error event $E_k$ that will minimize equation (5)), and the preliminary sequence 90 output by the trellis sequence detector 88 is corrected with a corresponding correction sequence. In FIG. 5, the post processor 95 performs the error metric calculations, detects the error events (e.g., by generating an error syndrome), and corrects the preliminary sequence 90 when an error is detected.

Figure 8A:
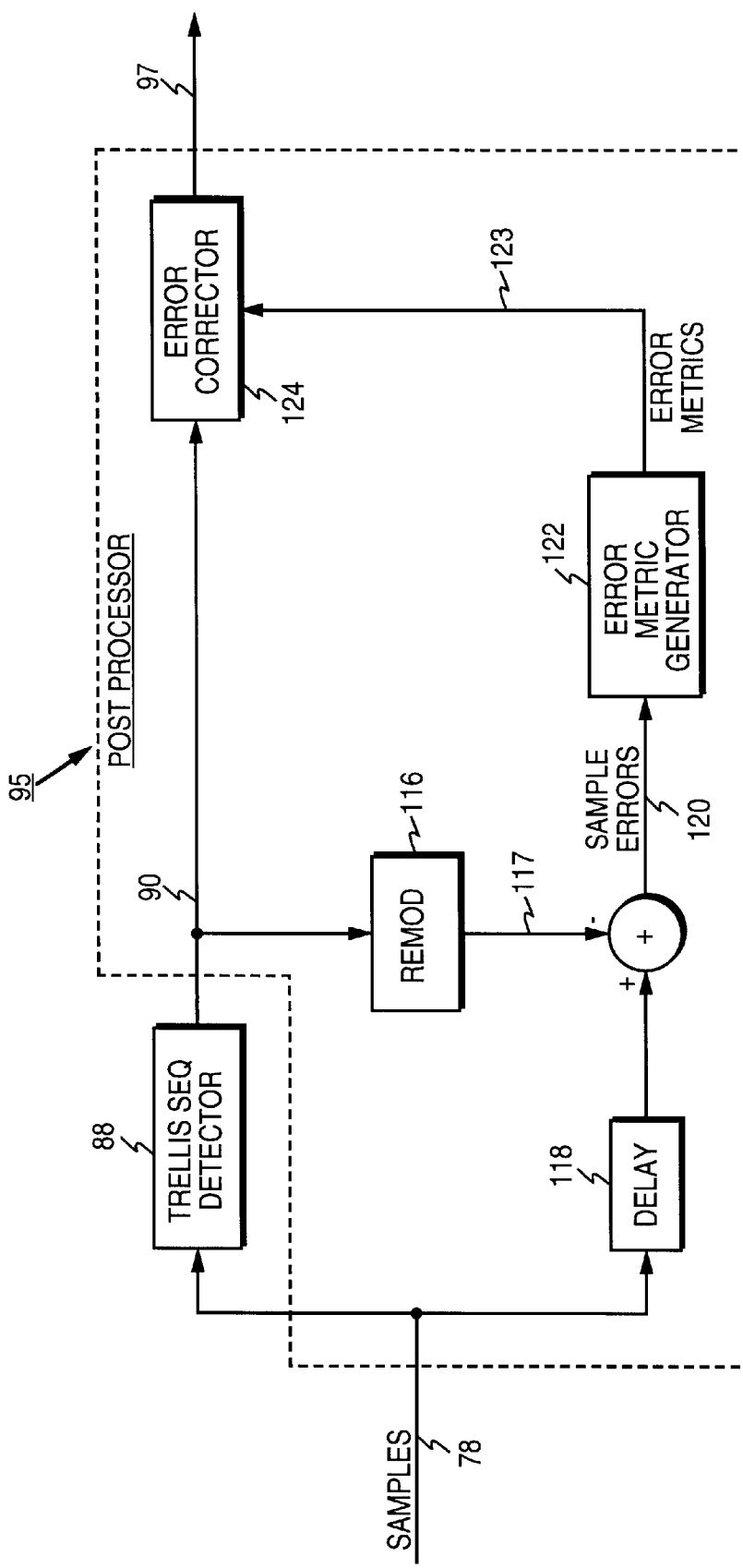
FIG. 8A shows details of the post processor of the present invention, including a remodulator for remodulating the preliminary sequence output by the trellis sequence detector into an estimated sample sequence, an error metric generator for generating error metrics from the estimated sample sequence, and an error corrector for correcting errors in the preliminary sequence using the error metrics.

General details for implementing the post processor 95 are shown in FIG. 8A. A remodulator 116 remodulates the preliminary sequence 90 output by the trellis sequence detector 88 into an estimated sequence of ideal sample values 117 which are subtracted from the channel samples 78 (after passing through a delay 118 to account for the delay in the sequence detector 88) to generate a sequence of sample error values 120 (the noise sequence $n_k$ in equation (5)). An error metric generator 122 processes the sequence of sample errors 120 to generate the error metrics 123 that are assigned to the bits of the preliminary sequence 90. The error metric generator 122 comprises a plurality of finite-impulse-response (FIR) filters for performing the correlations in equation (5)

$$\sum_{k=0}^{L} E_k n_k$$

where $E_k$ are the error event sequences, for example, the error sequences corresponding to the NRZ (+) and NRZ (+−+) dominant error events.

An error corrector 124 processes the error metrics 123 to detect and correct error events in the preliminary sequence 90. In one embodiment of the present invention, the error corrector 124 detects an error event if the error metrics simply exceed a predetermined threshold and the preliminary sequence 90 is consistent with the detected error event. This embodiment, however, suffers from the possibility of making a miscorrection when a false error event is detected. Therefore, in the preferred embodiment an error detection code is employed to detect errors in the preliminary sequence 90.

Figure 8B:
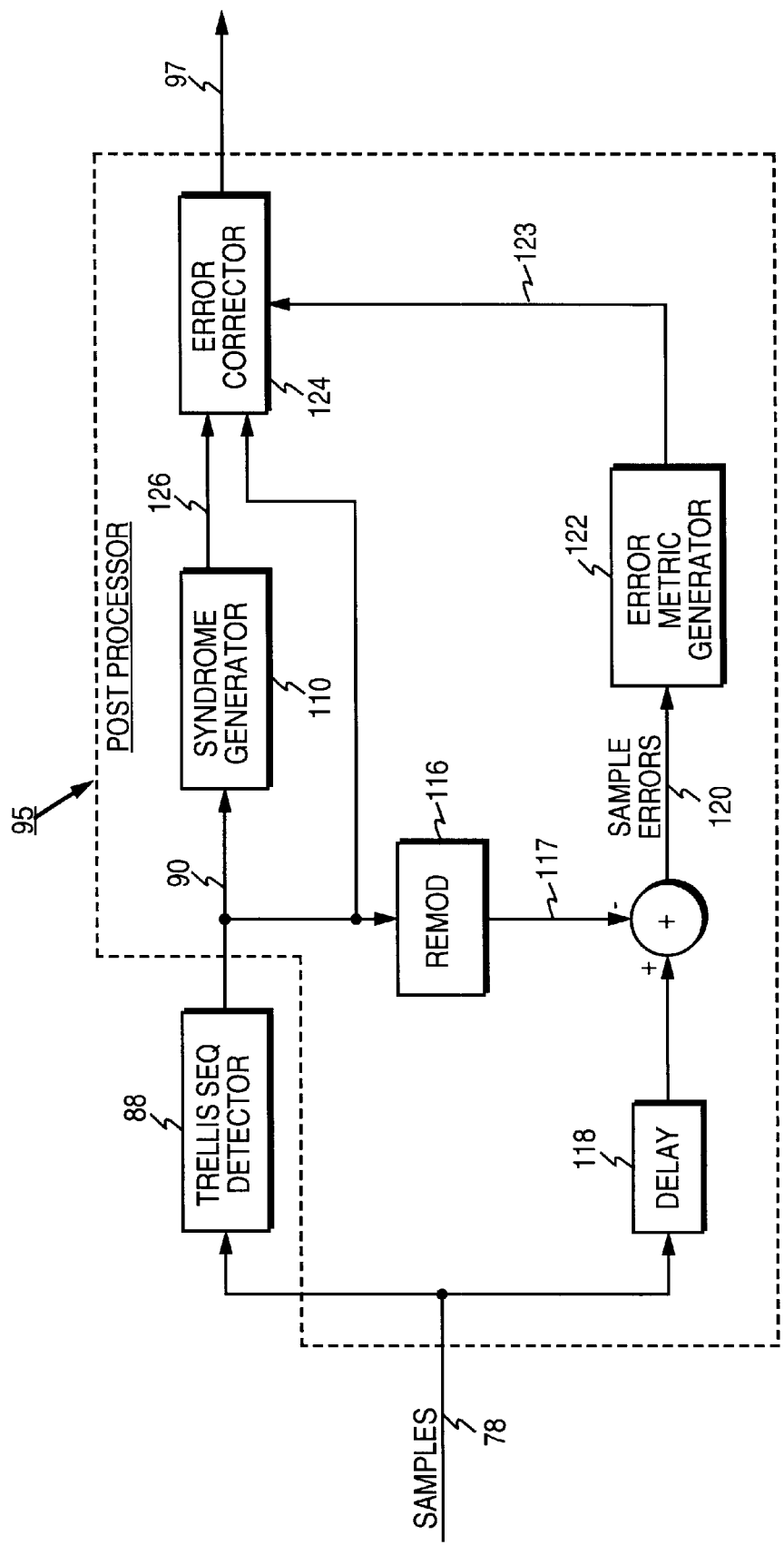
FIG. 8B shows an enhancement to the present invention wherein the post processor further comprises a syndrome generator for generating an error syndrome of an error detection code, the error syndrome for enabling the error corrector.

Details for the error detection code embodiment of the post processor 95 is shown in FIG. 8B. The error detection code, which in the preferred embodiment is a simple parity code, is used to detect when an error occurs in a predetermined number of bits in the preliminary sequence 90 (i.e., a block or codeword). A syndrome generator 110 shown in FIG. 8B processes the preliminary sequence 90 output by the trellis sequence detector 88 to generate an error syndrome 126 which indicates whether an error occurred in the current codeword. When an error is detected, the error corrector 124 corrects the preliminary sequence using the error metrics 123 assigned to the symbols of the preliminary sequence by the error metric generator 122. In this manner, the probability of a miscorrection decreases because the error syndrome 126 only allows a correction to occur when an error is present. A miscorrection can still occur if the error corrector 124 selects the wrong error metrics to make the correction-nevertheless, it is still a significant improvement over the prior art.

Figure 8C:
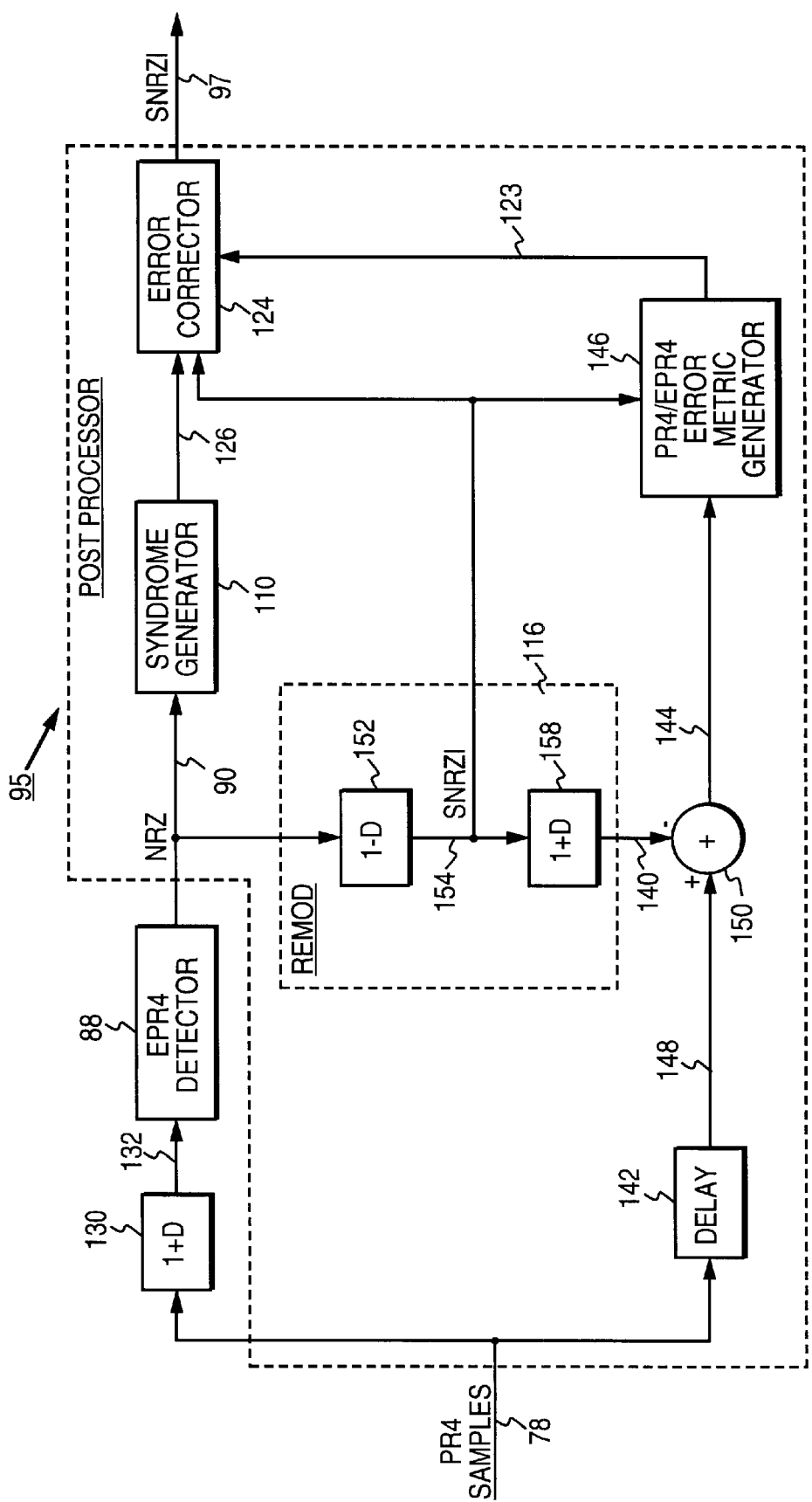
FIG. 8C shows further details of the preferred embodiment for the post processor of the present invention wherein the trellis sequence detector operates in the EPR4 domain and the error metric generator operates in the PR4/EPR4 domain.

As discussed above with reference to FIG. 5, in the preferred embodiment the channel samples 78 are equalized into a PR4 response so that a simple slicer circuit can generate the estimated sample values for use by timing recovery 68 and gain control 80. Referring to FIG. 8C, the PR4 samples 78 are converted to EPR4 samples 132 by a simple (1+D) filter 130. An EPR4 sequence detector 88 processes the EPR4 samples 132 to detect a preliminary NRZ sequence 90, and the NRZ sequence 90 is then remodulated by remodulator 116 to generate a sequence of estimated PR4 sample values 140 similar to FIG. 8A. The estimated PR4 sample values 140 are subtracted from the PR4 channel samples 78 (after passing through a delay 142 to account for the delay in the EPR4 detector 88) to generate a sequence of sample error values 144. A PR4/EPR4 error metric generator 146 processes the sample error values 144 to generate the error metrics assigned to the symbols of the preliminary sequence. A syndrome generator 110 generates an error syndrome (e.g., parity) over a block of the NRZ sequence 90 and, if the error syndrome 126 indicates that the EPR4 detector 88 made a detection error, a signed NRZI sequence 154 (generated by the remodulator 116) is corrected by an error corrector 124 using the error metrics 123 associated with the most likely error event to have caused the error.

Figure 9:
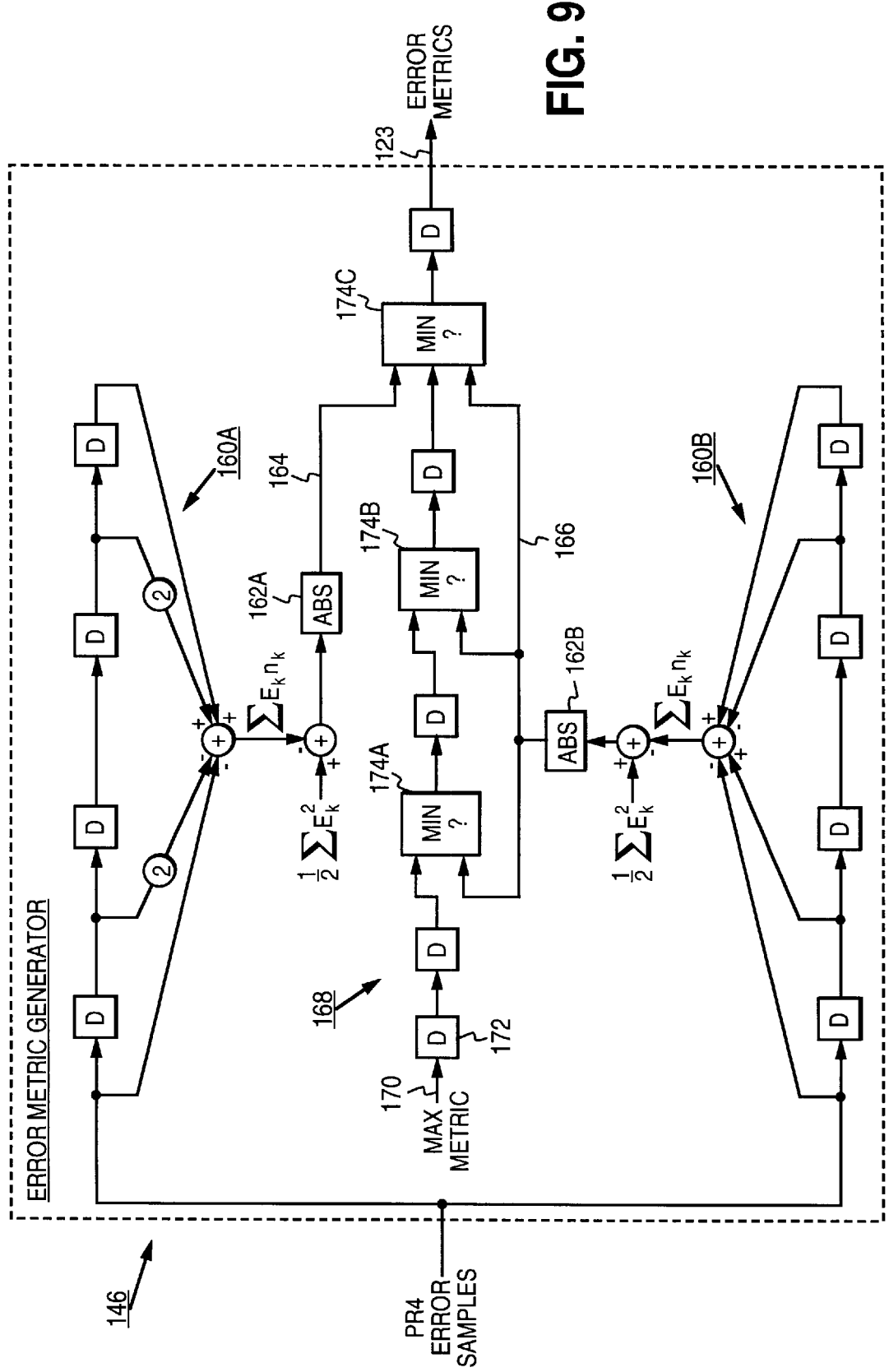
FIG. 9 shows details of the error metric generator, including correlators matched to the dominant error events of the trellis sequence detector for generating the error metrics, and comparators for assigning the minimum error metrics to the symbols of the preliminary sequence.

The remodulator 116 of FIG. 8C comprises a 1-D filter 152 for converting the NRZ sequence 90 into a signed NRZI (SNRZI) sequence 154, and a 1+D filter 158 for converting the SNRZI sequence 154 into a sequence of estimated PR4 sample values 140. The estimated PR4 sample sequence 140 is then subtracted from the actual read signal sample values 148 at adder 150 to generate the PR4 sample error sequence 144 processed by the error metric generator 146. Further details of the error metric generator 146 are shown in FIG. 9.

Computer simulations have established that, for user densities of 1.8 to 2.5, the most dominant error event (the (+) error event) is best detected in the EPR4 domain, while the next most dominant error event (the (+−+) error event) is best detected in the PR4 domain. Therefore, the PR4/EPR4 error metric generator 146 of the present invention comprises two FIR filters of the form:

$$(1+2D+D^2)(1-D^2) \text{ and}$$

$$1-D+D^3-D^4.$$

The first FIR filter 160A is matched to the NRZ (+) error event in the EPR4 domain, and the second FIR filter 160B is matched to the NRZ (+−+) error event in the PR4 domain. In an alternative embodiment, both error events could be detected in the EPR4 domain which might improve the performance depending on the system dynamics and/or the recording density employed.

The FIR filters 160A and 160B of FIG. 9 perform the correlation operation $$\sum_{k=0}^{L} E_k n_k$$

of equation (5) described above, where $E_k$ are the sample error sequences corresponding to the NRZ (+) and NRZ (+−+) error events in the EPR4 and PR4 domains, respectively. The FIR filter outputs are subtracted from the constant $$\frac{1}{2}\sum_{k=0}^{L} E_k^2$$

of equation (5). The above constant is calculated using the known sample error sequence $E_k$ for each error event in the partial response domains of the respective FIR filters. For example, the error sequence $E_k$ in the EPR4 domain for the NRZ (+) error event detected by FIR filter 160A is {−1, −1, +1, +1}, and the error sequence $E_k$ in the PR4 domain for the NRZ (+−+) error event detected by FIR filter 160B is {−1, +1, 0, −1, +1}. Note that when the NRZ (+) and NRZ (+−+) error events are detected in the EPR4 and PR4 domains, respectively, the constant in equation (5) is the same. Therefore, the constant can be dropped from equation (5) (and omitted from the circuitry of FIG. 9) since it does not affect the computation of the minimum error metric.

The computed error metrics are passed through absolute magnitude circuits 162A and 162B which take the absolute magnitude of the error metrics to account for the negative polarity error events $E_k$ in the PR4 error samples. In other words, the FIR filters 160A and 160B in FIG. 9 are matched only to the positive error events such that a negative error event will generate a negative error metric. Thus, it is necessary to take the absolute magnitude of the error metric before finding the minimum error metric. This implementation allows both the positive and negative error events to be detected using a single FIR filter rather than employ a separate FIR filter for detecting the negative error events.

Ultimately the minimum of error metrics 164 and 166 are assigned to the symbols of the preliminary sequence output by the trellis sequence detector 88. In FIG. 9, a number of delay registers 168 are connected serially for storing the error metrics associated with each symbol of the preliminary sequence. The error metric for each symbol is initialized to a maximum error metric 170 which is shifted into the first delay register 172. Then, at each sample interval, the error metrics are shifted through the array of delay registers 168, and the error metrics 164 and 166 computed for the NRZ (+) and NRZ (+−+) error events are compared to the current error metric assigned to the corresponding symbol of the preliminary sequence. If the current error metric is smaller than the previous error metric, then the current error metric replaces the previous error metric. The compare and replace operation is carried out by comparators 174A, 174B, and 174C.

In FIG. 9, the error metrics are compared and assigned only at particular locations within the preliminary sequence. For instance, the error metric 164 for the NRZ (+) error event is only compared at one bit within the preliminary sequence at comparator 174C, whereas the error metric 166 for the NRZ (+−+) error event is compared at three consecutive bits within the preliminary sequence at comparators 174A, 174B and 174C. The particular bits where the error metrics are evaluated and updated correspond to the bits in the preliminary sequence that differ from the alternate sequence associated with the error event. As explained above with reference to FIGS. 7A and 7B, a NRZ (+) error event will cause the two alternate output sequences to differ in the first bit (i.e., the circled bit in FIG. 7A), whereas the NRZ (+−+) error event will cause the two alternate output sequences to differ in the first three bits (i.e., the three circled bits in FIG. 7B). As the error metrics 123 are output from the error metric generator 146, they are transmitted to the error corrector 124 of FIG. 8C where they are buffered and used to detect and correct error events in the preliminary SNRZI sequence 154.

Figure 10:
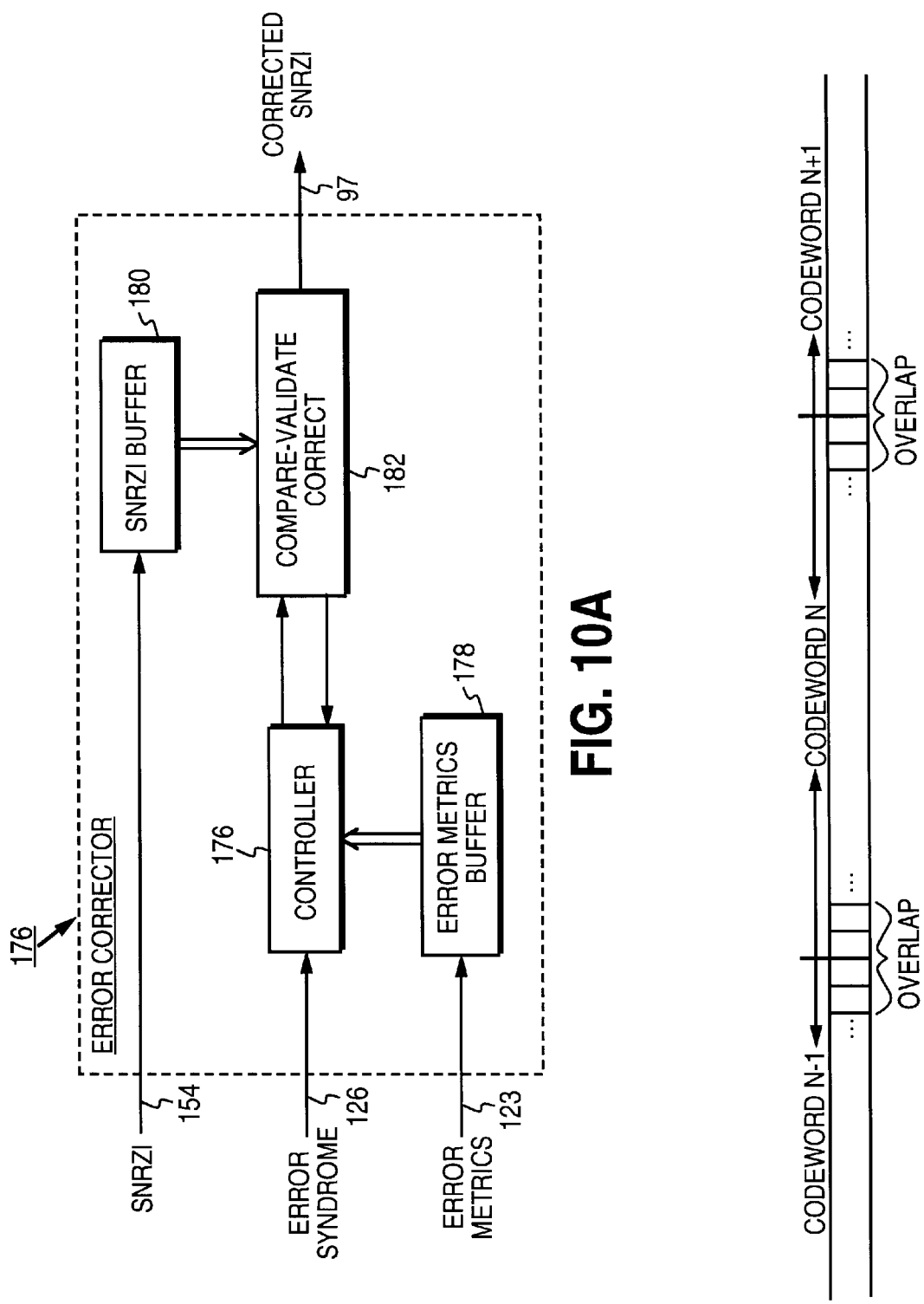
FIG. 10A shows details of the error corrector of the present invention, including a controller responsive to the error syndrome it and the error metrics, and a compare-validate-correct circuit for validating error events and correcting errors in the preliminary SNRZI sequence output by the EPR4 trellis sequence detector.
FIG. 10B illustrates the operation of the error corrector in detecting and correcting error events that occur at the boundaries of the error detection codewords.

Details of the error corrector 124 of FIG. 8C are shown in FIG. 10A. A controller 176 is shown for performing the error detection and correction operations; however, the controller 176 is not necessarily a separate element of the error corrector 124, nor is it necessarily a central processing unit (CPU). In practice, the controller 176 could be implemented as simple logic circuits distributed throughout the post processor 95. The controller 176 is shown as an element of the error corrector 124 to illustrate that some form of control circuitry is necessary to process the error syndrome 126 and the error metrics 123 stored in an error metrics buffer 178 to detect and correct errors in the preliminary SNRZI sequence 154.

If an error detection code is not employed, then the controller 176 only processes the error metrics 123 in the metrics buffer 178 to detect the error events rather than rely on the error syndrome 126. For instance, the controller 176 might detect an error event when the error metrics 123 exceed a predetermined threshold. In this embodiment, the controller 176 would search for an isolated error metric that is less than the threshold (for the NRZ (+) error event), and it would search for three consecutive error metrics that are less than the threshold and within some margin from one another (for the NRZ (+−+) error event). As described above, it is preferable to employ an error detection code to avoid the miscorrections that can otherwise occur with this embodiment.

If an error detection code is employed, then the controller 176 of FIG. 10A is enabled by the error syndrome 126 generated by the syndrome generator 110 of FIG. 8C. When the error syndrome 126 indicates the presence of an error in the preliminary SNRZI sequence 154 stored in the SNRZI buffer 180, the controller evaluates the error metrics 123 stored in the metrics buffer 178 to determine the most likely error event to have caused the error. Again, the most likely error event corresponds to the minimum isolated error metric for the NRZ (+) error event, or to the minimum three consecutive error metrics for the NRZ (+−+) error metrics. Once the most likely error event has been determined, the controller 176 passes the error event and its location to a compare-validate-correct circuit 182 which verifies the validity of the detected error event with respect to the preliminary SNRZI sequence 154 stored in the SNRZI buffer 180, and then corrects the SNRZI sequence 154 if the detected error event is valid. An error event is deemed valid if the preliminary SNRZI sequence 154 stored in the SNRZI buffer 180 is consistent with the detected error event.

The compare-validate-correct circuit 182 of FIG. 10A comprises a lookup table that operates according to Table 2 and Table 3 below which show the expected SNRZI sequences resulting from the two NRZ error events E1 (+) and E2 (+−+), as well as the corresponding corrected output sequences.

TABLE 2

| | NRZ Error (+) | | | | | | | |
|---|---|---|---|---|---|---|---|---|
| | Expected SNRZI | | Corrected SNRZI | | | Expected SNRZI | | Corrected SNRZI | |
| E1 | $S_n$ | $S_{n-1}$ | $S_n$ | $S_{n-1}$ | E1 | $S_n$ | $S_{n-1}$ | $S_n$ | $S_{n-1}$ |
| E1 < 0 | +1 | −1 | +0 | +0 | E1 > 0 | −1 | +1 | −0 | −0 |
| E1 < 0 | −0 | −1 | −1 | +0 | E1 > 0 | +0 | +1 | +1 | −0 |
| E1 < 0 | +1 | −0 | +0 | +1 | E1 > 0 | −1 | +0 | −0 | −1 |
| E1 < 0 | −0 | −0 | −1 | +1 | E1 > 0 | +0 | +0 | +1 | −1 |

TABLE 3

| | NRZ Error (+ − +) | | | | | | | |
|---|---|---|---|---|---|---|---|---|
| | Expected SNRZI | | | | Corrected SNRZI | | | |
| E2 | $S_n$ | $S_{n-1}$ | $S_{n-2}$ | $S_{n-3}$ | $S_n$ | $S_{n-1}$ | $S_{n-2}$ | $S_{n-3}$ |
| E2 < 0 | −0 | −1 | +1 | −0 | −1 | +1 | −1 | +1 |
| E2 < 0 | −0 | −1 | +1 | −1 | −1 | +1 | −1 | +0 |
| E2 < 0 | +1 | −1 | +1 | −0 | +0 | +1 | −1 | +1 |
| E2 < 0 | +1 | −1 | +1 | −1 | +0 | +1 | −1 | +0 |
| E2 > 0 | +0 | +1 | −1 | +0 | +1 | −1 | +1 | −1 |
| E2 > 0 | +0 | +1 | −1 | +1 | +1 | −1 | +1 | −0 |
| E2 > 0 | −1 | +1 | −1 | +0 | −0 | −1 | +1 | −1 |
| E2 > 0 | −1 | +1 | −1 | +1 | −0 | −1 | +1 | −0 |

Figure 11:
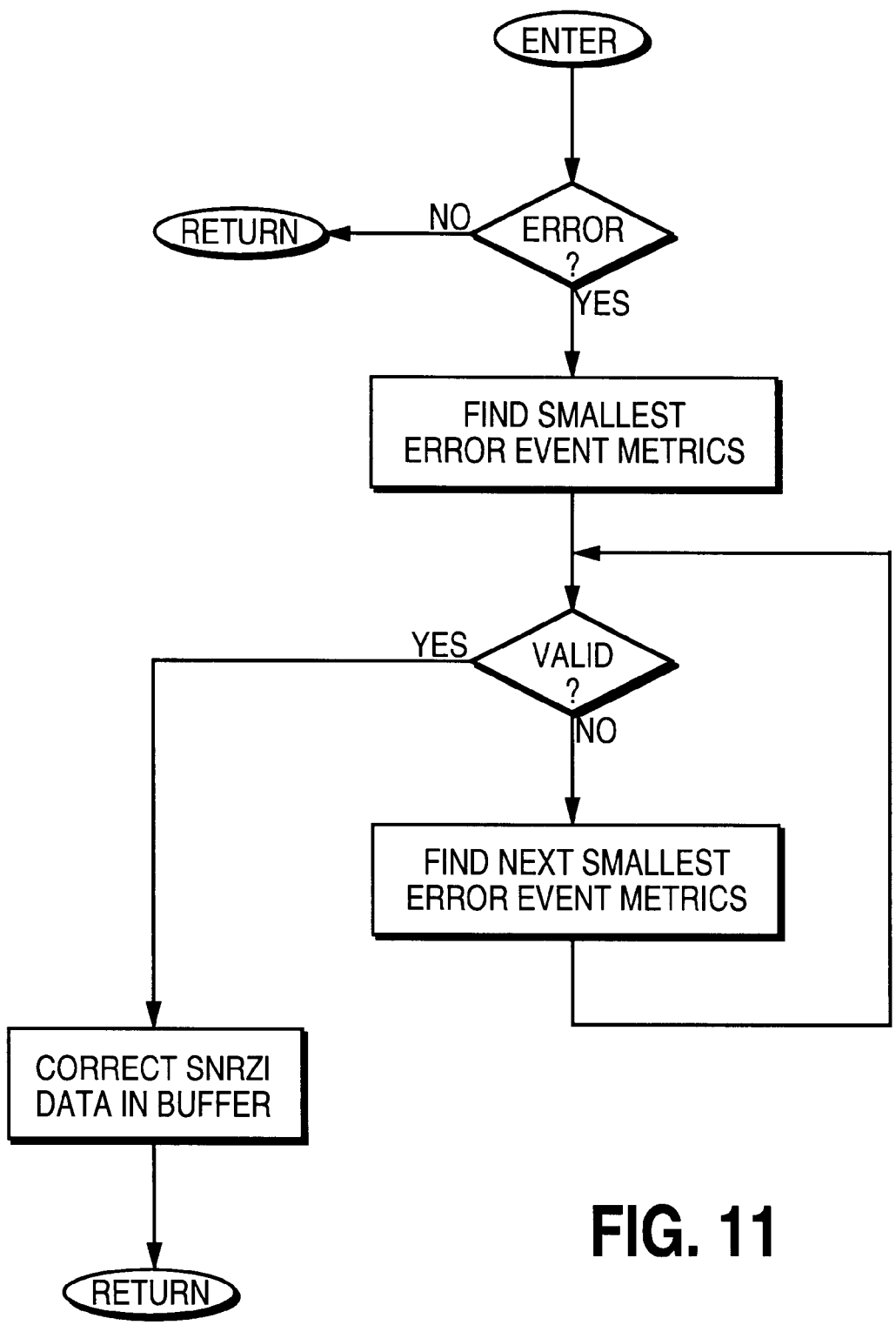
FIG. 11 is a flow diagram illustrating the steps executed by the controller of the error corrector in FIG. 10A.

As described above, the error events E1 and E2 can be positive or negative depending on the polarity of the sample error sequence 144. The detected SNRZI sequence stored in the SNRZI buffer 180 of FIG. 10A is compared to the "Expected SNRZI" sequences in the above lookup tables to determine whether a valid correction can be made. The compare-validate-correct circuitry 182 may also evaluate the "Corrected SNRZI" sequences in the above tables relative to the surrounding bits stored in the SNRZI buffer 180 to determine whether a correction will violate a particular channel code constraint that may be employed (e.g., an RLL constraint). If the preliminary SNRZI sequence 154 is not consistent with the "Expected SNRZI" sequence in the above tables, or if the corresponding correction sequence would violate a channel code constraint, then the compare-validate-correct circuitry 182 signals the controller 176 to search for the next most likely error event. This process is repeated until a valid error event is found and corrected as illustrated by the flow diagram of FIG. 11.

When an error detection code is employed, the preliminary SNRZI sequence 154 is processed by the controller 176 of FIG. 10A in blocks or codewords as illustrated in FIG. 10B. A codeword comprises a number of data symbols together with a number of redundancy symbols for generating the error syndrome. The example codewords shown in FIG. 10B form a one-dimensional linear block code; however, a more sophisticated product code could be employed as described in the above referenced co-pending U.S. patent application entitled "ERROR CORRECTION USING RELIABILITY VALUES FOR DATA MATRIX". In any event, it is possible that an error event will span the codeword boundaries, that is, an error event might begin in a current codeword and extend through to a following codeword. Therefore, in the preferred embodiment the controller 176 of FIG. 10A evaluates the error metrics 123 assigned to the symbols of the preliminary SNRZI sequence 154 in an overlapping manner. This is illustrated in FIG. 10B which shows an overlap of two symbols into the following and preceding codewords to account for the NRZ (+−+) error event which can affect three consecutive symbols as shown in FIG. 7B. Thus, if the error syndrome 126 indicates a codeword contains an error, the controller 176 will evaluate the error metrics 123 assigned to the current codeword together with the last two error metrics assigned to the previous codewords and the first two error metrics assigned to the following codeword when searching for the minimum NRZ (+−+) error event.

The objects of the invention have been fully realized through the embodiments disclosed herein. Those skilled in the art will appreciate that the various aspects of the invention can be achieved through different embodiments without departing from the essential function. For example, the aspects of the present invention could be applied to attenuate errors made by a trellis sequence detector implemented in a domain other than EPR4. Furthermore, the particular error events disclosed in the example embodiment are illustrative; different error events or additional error events could be detected depending on the recording density or partial response target employed. Still further, those skilled in the art will appreciate that error detection codes other than parity could be employed to detect when the trellis sequence detector has made a detection error. The particular embodiments disclosed are illustrative and not meant to limit the scope of the invention as appropriately construed from the following claims.

I claim:

1. A sampled amplitude read channel for reading data recorded on a disk storage medium by detecting an estimated data sequence from a sequence of discrete-time read signal sample values generated by sampling an analog read signal emanating from a read head positioned over the disk storage medium, the sampled amplitude read channel comprising:
    (a) a sampling device for sampling the analog read signal to generate the read signal sample values;
    (b) a discrete-time trellis sequence detector for detecting a preliminary sequence from the read signal sample values with respect to a trellis; and
    (c) a post processor for detecting and correcting errors in the preliminary sequence comprising:
        (i) a remodulator for remodulating the preliminary sequence into a sequence of estimated sample values;
        (ii) a sample error generator, responsive to the read signal sample values and the estimated sample values for generating a sequence of sample errors;
        (iii) an error metric generator, responsive to the sample errors, for generating an error metric between the read signal sample values and sample values of an alternate sequence through the trellis, wherein the error metric is assigned to at least one symbol in the preliminary sequence; and
        (iv) an error corrector for correcting errors in the preliminary sequence using the error metric.

2. The sampled amplitude read channel as recited in claim 1, wherein the error metric generator comprises a correlator for correlating an error sequence corresponding to an error event of the sequence detector with the sample errors to generate a correlated error value for use in generating the error metric.

3. The sampled amplitude read channel as recited in claim 2, wherein:
    (a) the error metric generator further comprises a memory for storing a constant corresponding to the error sequence; and
    (b) the error metric generator computes the error metric from the correlated error value and the constant stored in memory.

4. The sampled amplitude read channel as recited in claim 1, wherein the error metric generator assigns the error metric to a symbol in the preliminary sequence that differs from a corresponding symbol in the alternate sequence.

5. The sampled amplitude read channel as recited in claim 1, wherein the error metric generator assigns the error metric to more than one symbol in the preliminary sequence.

6. The sampled amplitude read channel as recited in claim 5, wherein the error metric generator assigns the error metric to only those symbols in the preliminary sequence that differ from corresponding symbols in the alternate sequence.

7. The sampled amplitude read channel as recited in claim 1, wherein the error metric generator comprises a comparator for comparing a current error metric to a previous error metric previously assigned to a symbol.

8. The sampled amplitude read channel as recited in claim 7, wherein the error metric generator assigns the current error metric to the symbol if the current error metric is smaller than the previous error metric.

9. The sampled amplitude read channel as recited in claim 1, wherein the error corrector evaluates a magnitude of the error metrics to detect and correct an error event in the preliminary sequence.

10. The sampled amplitude read channel as recited in claim 1, wherein the error corrector further comprises an error event validator, responsive to the preliminary sequence, for verifying a validity of a detected error event.

11. The sampled amplitude read channel as recited in claim 1, wherein:
    (a) the post processor further comprises a syndrome generator for generating an error syndrome in response to the preliminary sequence; and
    (b) the error corrector corrects an error in the preliminary sequence using the error metric when the error syndrome indicates the preliminary sequence contains a symbol in error.

12. A sampled amplitude read channel for reading data recorded on a disk storage medium by detecting an estimated data sequence from a sequence of discrete-time read signal sample values generated by sampling an analog read signal emanating from a read head positioned over the disk storage medium, the sampled amplitude read channel comprising:
    (a) a sampling device for sampling the analog read signal to generate the read signal sample values;
    (b) a discrete-time trellis sequence detector for detecting a preliminary sequence from the read signal sample values with respect to a trellis; and
    (c) a post processor for detecting and correcting errors in the preliminary sequence comprising:
        (i) a remodulator for remodulating the preliminary sequence into a sequence of estimated sample values;
        (ii) an error metric generator, responsive to the estimated sample values, for generating an error metric between the read signal sample values and sample values of an alternate sequence through the trellis, wherein the error metric is assigned to at least one symbol in the preliminary sequence; and
        (iii) an error corrector for correcting errors in the preliminary sequence using the error metric.

13. The sampled amplitude read channel as recited in claim 12, wherein:
    (a) the post processor further comprises a sample error generator, responsive to the read signal sample values and the estimated sample values for generating a sequence of sample errors; and
    (b) the error metric generator comprises a correlator for correlating an error sequence corresponding to a predetermined error event of the sequence detector with the sample errors to generate a correlated error value for use in generating the error metric.

14. The sampled amplitude read channel as recited in claim 13, wherein the predetermined error event is a dominant error event of the sequence detector.

15. The sampled amplitude read channel as recited in claim 12, wherein the error metric generator assigns the error metric to a symbol in the preliminary sequence that differs from a corresponding symbol in the alternate sequence.

16. The sampled amplitude read channel as recited in claim 12, wherein the error metric generator assigns the error metric to more than one symbol in the preliminary sequence.

17. The sampled amplitude read channel as recited in claim 16, wherein the error metric generator assigns the error metric to only those symbols in the preliminary sequence that differ from corresponding symbols in the alternate sequence.

18. The sampled amplitude read channel as recited in claim 12, wherein the error metric generator comprises a comparator for comparing a current error metric to a previous error metric previously assigned to a symbol.

19. The sampled amplitude read channel as recited in claim 18, wherein the error metric generator assigns the current error metric to the symbol if the current error metric is smaller than the previous error metric.

20. The sampled amplitude read channel as recited in claim 12, wherein the error corrector evaluates a magnitude of the error metrics to detect and correct an error event in the preliminary sequence.

21. The sampled amplitude read channel as recited in claim 12, wherein the error corrector further comprises an error event validator, responsive to the preliminary sequence, for verifying a validity of a detected error event.

22. The sampled amplitude read channel as recited in claim 12, wherein:

(a) the post processor further comprises a syndrome generator for generating an error syndrome in response to the preliminary sequence; and (b) the error corrector corrects an error in the preliminary sequence using the error metric when the error syndrome indicates the preliminary sequence contains a symbol in error.

23. A method of reading data recorded on a disk storage medium by detecting an estimated data sequence from a sequence of discrete-time read signal sample values generated by sampling an analog read signal emanating from a read head positioned over the disk storage medium, comprising the steps of:

(a) sampling the analog read signal to generate the read signal sample values;

(b) detecting a preliminary sequence from the read signal sample values using a trellis sequence detector operating according to a predetermined trellis;

(c) remodulating the preliminary sequence into a sequence of estimated sample values;

(d) generating an error metric between the read signal sample values and sample values of an alternate sequence through the trellis using the estimated sample values;

(e) assigning the error metric to at least one symbol in the preliminary sequence; and (f) processing the error metrics to detect and correct errors in the preliminary sequence.

24. The method of reading data recorded on a disk storage medium as recited in claim 23, wherein the step of generating the error metric comprises the steps of:

(a) generating a sequence of sample errors from the read signal sample values and the estimated sample values; and (b) correlating an error sequence corresponding to a predetermined error event of the sequence detector with the sample errors to generate a correlated error value for use in generating the error metric.

25. The method of reading data recorded on a disk storage medium as recited in claim 24, wherein the predetermined error event is a dominant error event of the sequence detector.

26. The method of reading data recorded on a disk storage medium as recited in claim 23, wherein the step of assigning comprises the step of assigning the error metric to a symbol in the preliminary sequence that differs from a corresponding symbol in the alternate sequence.

27. The method of reading data recorded on a disk storage medium as recited in claim 23, wherein the step of assigning comprises the step of assigning the error metric to more than one symbol in the preliminary sequence.

28. The method of reading data recorded on a disk storage medium as recited in claim 27, wherein the step of assigning comprises the step of assigning the error metric to only those symbols in the preliminary sequence that differ from corresponding symbols in the alternate sequence.

29. The method of reading data recorded on a disk storage medium as recited in claim 23, wherein the step of assigning comprises the step of comparing a current error metric to a previous error metric previously assigned to a symbol.

30. The method of reading data recorded on a disk storage medium as recited in claim 29, wherein the step of assigning comprises the step of assigning the current error metric to the symbol if the current error metric is smaller than the previous error metric.

31. The method of reading data recorded on a disk storage medium as recited in claim 23, wherein the step of detecting errors in the preliminary sequence comprises the step of comparing a magnitude of the error metrics.

32. The method of reading data recorded on a disk storage medium as recited in claim 23, further comprising the step of verifying a validity of a detected error event.

33. The method of reading data recorded on a disk storage medium as recited in claim 23, wherein the step of detecting and correcting errors in the preliminary sequence comprises the steps of:

(a) generating an error syndrome in response to the preliminary sequence; and (b) correcting an error in the preliminary sequence using the error metric when the error syndrome indicates the preliminary sequence contains a symbol in error.

* * * * *